US010059004B2

United States Patent
Inaba et al.

(10) Patent No.: US 10,059,004 B2
(45) Date of Patent: Aug. 28, 2018

(54) ROBOT, INFORMATION PROCESSING SYSTEM, AND STORAGE MEDIUM

(71) Applicants: Daiki Inaba, Tokyo (JP); Wataru Hatanaka, Kanagawa (JP); Hiroshi Shimura, Kanagawa (JP); Atsuo Kawaguchi, Kanagawa (JP)

(72) Inventors: Daiki Inaba, Tokyo (JP); Wataru Hatanaka, Kanagawa (JP); Hiroshi Shimura, Kanagawa (JP); Atsuo Kawaguchi, Kanagawa (JP)

(73) Assignee: Ricoh Company, Ltd., Tokyo (JP)

(\*) Notice: Subject to any disclaimer, the term of this patent is extended or adjusted under 35 U.S.C. 154(b) by 79 days.

(21) Appl. No.: 15/176,799

(22) Filed: Jun. 8, 2016

(65) Prior Publication Data

US 2016/0368149 A1    Dec. 22, 2016

(30) Foreign Application Priority Data

Jun. 22, 2015  (JP) .................... 2015-124516
Apr. 19, 2016  (JP) .................... 2016-083341

(51) Int. Cl.
*B25J 9/16*  (2006.01)
*B25J 5/00*  (2006.01)
*B62D 55/075*  (2006.01)
*G05D 1/02*  (2006.01)
*G05D 1/08*  (2006.01)

(52) U.S. Cl.
CPC ............ *B25J 9/1697* (2013.01); *B25J 5/00* (2013.01); *B25J 5/005* (2013.01); *B25J 5/007* (2013.01);
(Continued)

(58) Field of Classification Search
CPC ... B25J 9/1697; B25J 5/00; B25J 5/005; B25J 5/007; B62D 55/075; G05D 1/0274;
(Continued)

(56) References Cited

U.S. PATENT DOCUMENTS 6,193,398 B1\* 2/2001 Okuchi ................. B60Q 1/115
                                                          362/276
2011/0190933 A1\* 8/2011 Shein ................... B62D 55/075
                                                          700/258
(Continued)

FOREIGN PATENT DOCUMENTS

JP        2009-241246      10/2009

OTHER PUBLICATIONS

Schenker et al. "Reconfigurable Robots for All Terrain Exploration", Proceedings SPIE, Sensor Fusion and Decentralized Control in Robotic Systems III, vol. 44196, Oct. 16, 2000, pp. 454-468 (Year: 2000).\*

(Continued)

*Primary Examiner* — John Olszewski
*Assistant Examiner* — Thomas E Worden
(74) *Attorney, Agent, or Firm* — Oblon, McClelland, Maier & Neustadt, L.L.P.

(57) ABSTRACT

A robot includes a three-dimensional shape detecting sensor to detect a three dimensional shape of a travel surface existing in a forward travelling direction of the robot, a posture stabilizer to stabilize a posture of a body of the robot, a feature data generator to generate feature data of the detected three dimensional shape, an inclination angle prediction generator to generate a prediction value of an inclination angle of the body when the robot is to reach a position on the travel surface in the forward travelling direction at a future time point based on the feature data and a prediction model, and an overturn prevention controller to control the posture stabilizer to prevent an overturn of the robot based on the prediction value.

9 Claims, 21 Drawing Sheets

(52) U.S. Cl.
CPC .......... *B62D 55/075* (2013.01); *G05D 1/024* (2013.01); *G05D 1/0223* (2013.01); *G05D 1/0251* (2013.01); *G05D 1/0274* (2013.01); *G05D 1/0891* (2013.01); *G05D 2201/0207* (2013.01); *Y10S 901/01* (2013.01); *Y10S 901/09* (2013.01); *Y10S 901/47* (2013.01)

(58) Field of Classification Search
CPC ... G05D 1/0891; Y10S 901/01; Y10S 901/09; Y10S 901/47
See application file for complete search history.

(56) References Cited

U.S. PATENT DOCUMENTS

| | | | |
|---|---|---|---|
| 2013/0079928 A1* | 3/2013 | Soe-Knudsen | B25J 9/1656 700/248 |
| 2014/0074291 A1* | 3/2014 | Emoto | B25J 9/1664 700/258 |
| 2015/0120044 A1* | 4/2015 | Cory | B62D 57/032 700/250 |

OTHER PUBLICATIONS

Extended European Search Report dated Oct. 25, 2016 in Patent Application No. 16173968.5.

P.S. Schenker, et al., "Reconfigurable robots for all terrain exploration" Sensor Fusion and Decentralized Control in Robotic Systems III, Proceedings of SPIE, vol. 4196, XP-002463942, Oct. 16, 2000, pp. 454-468.

Weiqiang Wang, et al., "Visual Traversability Analysis for Micro Planetary Rover" Proceedings of the 2009 IEEE International Conference on Robotics and Biomimetics, XP031641790, Dec. 19, 2009, pp. 907-912.

* cited by examiner

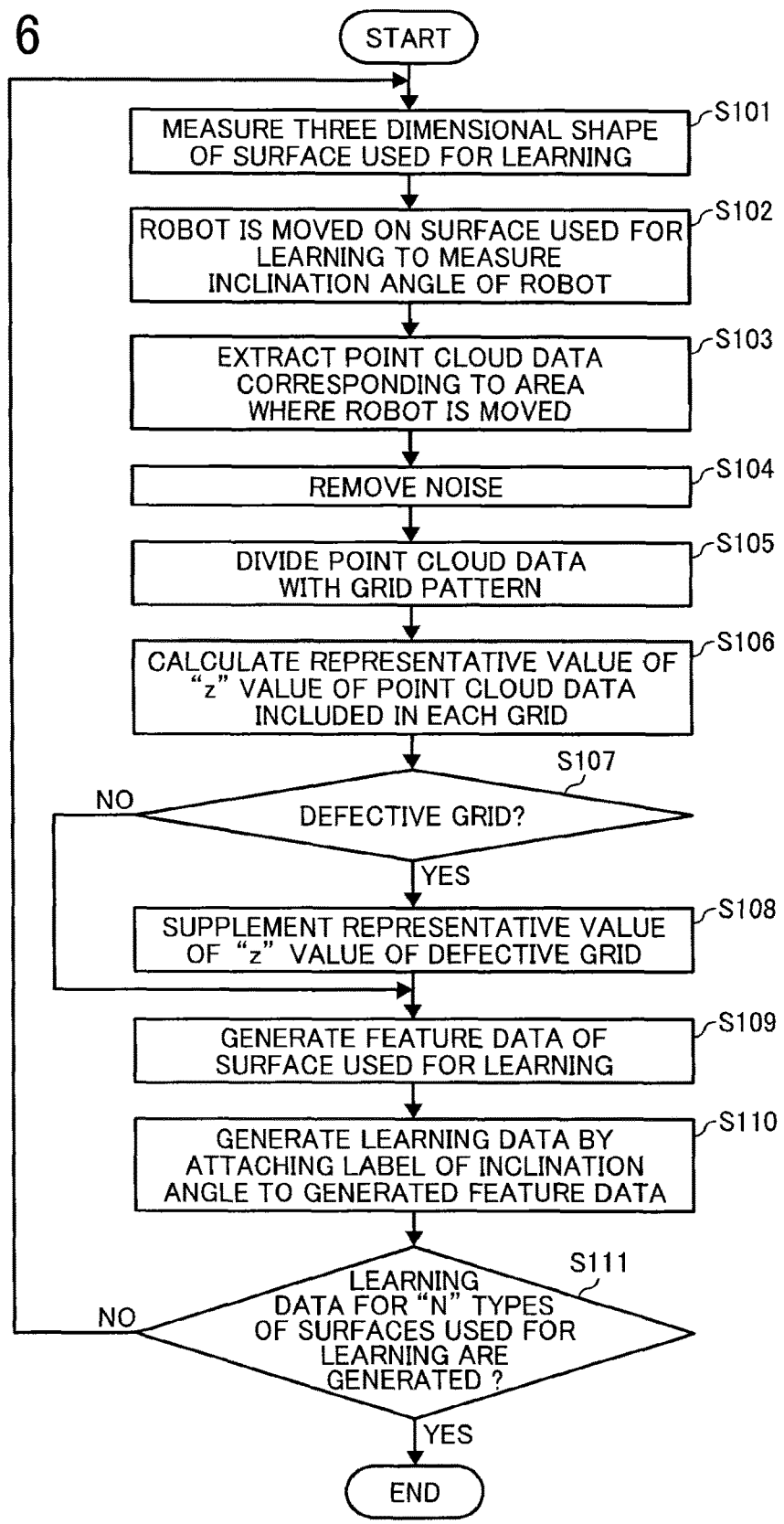

DEFECTIVE GRID

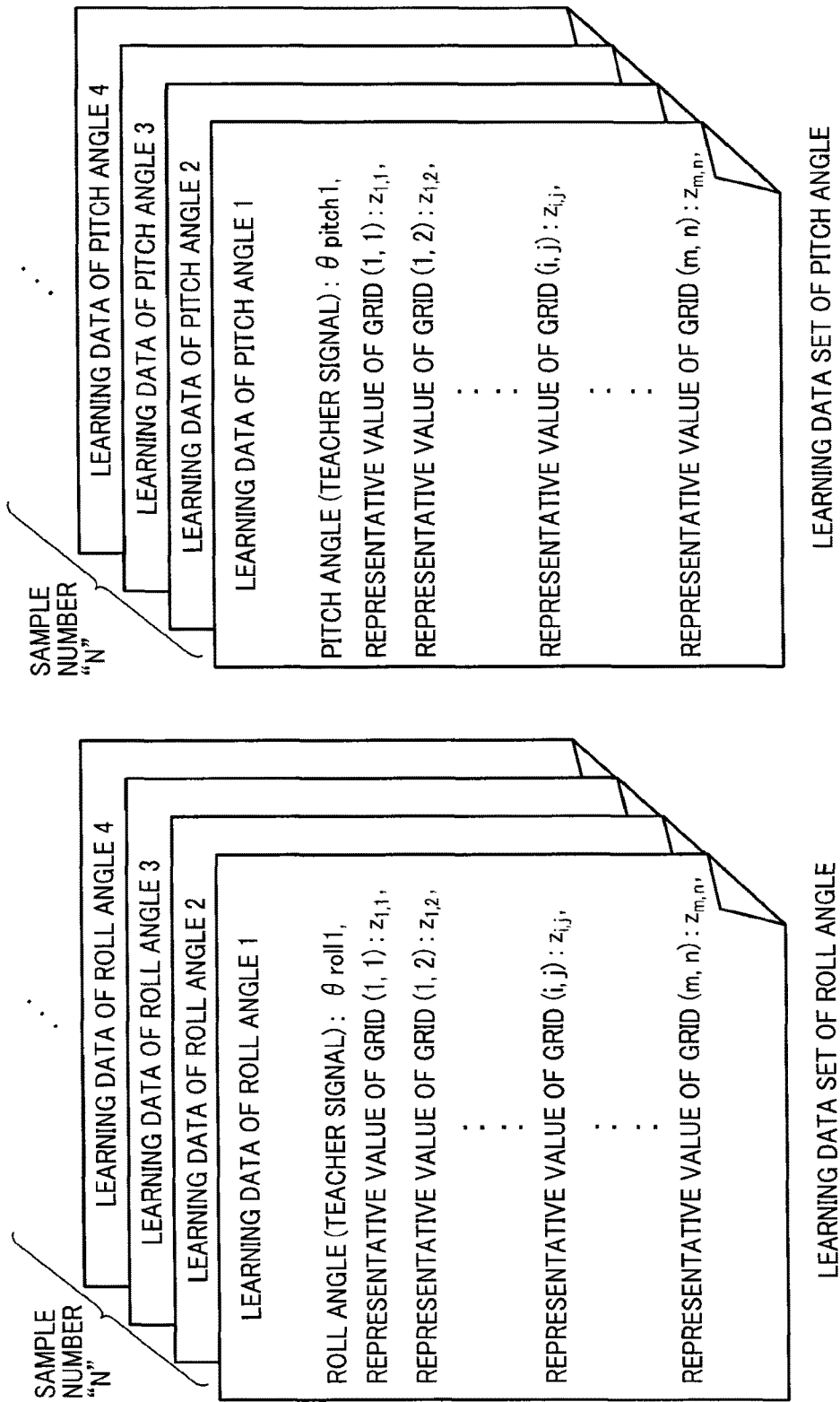

ROBOT, INFORMATION PROCESSING SYSTEM, AND STORAGE MEDIUM

CROSS-REFERENCE TO RELATED APPLICATION

This application claims priority pursuant to 35 U.S.C. § 119(a) to Japanese Patent Application Nos. 2015-124516, filed on Jun. 22, 2015, and 2016-083341, filed on Apr. 19, 2016 in the Japan Patent Office, the disclosure of which are incorporated by reference herein in their entirety.

BACKGROUND

Technical Field

This disclosure relates to a robot, an information processing system, and a storage medium.

Background Art

When autonomous mobile robots lose balance, the autonomous mobile robots may overturn. Posture control technologies to prevent the overturn of the robots are known, in which an inclination angle of the robots is detected to keep the robots at a leveled state. However, the posture control using the inclination angle is a feedback process. Therefore, when the robots are used on a travel surface having portions where shapes change abruptly, the robots may overturn because the posture control is too late to prevent the overturn.

JP-2009-241246-A discloses an autonomous mobile robot that can control moveable arms or legs based on a sensing result of a shape of the travel surface by using a laser range finder to prevent an overturn of the mobile robot. However, JP-2009-241246-A discloses the posture control method of the robot that moves on uneven terrain composed of regular-shaped steps, which can be modeled as a simple physical model. Therefore, JP-2009-241246-A cannot be applied to a posture control method of robots that move on uneven terrain, rough terrain, off-road terrain and irregular ground having complex shape.

SUMMARY

As one aspect of the present invention, a robot is devised. The robot includes a three-dimensional shape detecting sensor to detect a three dimensional shape of a travel surface existing in a forward travelling direction of the robot, a posture stabilizer to stabilize a posture of a body of the robot, a feature data generator to generate feature data of the detected three dimensional shape, an inclination angle prediction generator to generate a prediction value of an inclination angle of the body when the robot is to reach a position on the travel surface in the forward travelling direction at a future time point based on the feature data and a prediction model, and an overturn prevention controller to control the posture stabilizer to prevent an overturn of the robot based on the prediction value.

As another aspect of the present invention, a non-transitory storage medium storing a program that, when executed by a computer, causes the computer to execute a method of stabilizing a posture of a body of a robot is devised. The method includes detecting a three dimensional shape of a travel surface in a forward travelling direction of the robot by using a three-dimensional shape detecting sensor, generating feature data of the detected three dimensional shape, generating a prediction value of an inclination angle of the body when the robot is to reach a position on the travel surface in the forward travelling direction based on the generated feature data and a prediction model, the prediction model using the feature data of the three dimensional shape of the travel surface as an explanatory variable and the inclination angle of the body when the robot is to reach the position on the travel surface in the forward travelling direction at a future time point as a response variable, and controlling a posture stabilizer based on the prediction value to prevent an overturn of the robot.

As another aspect of the present invention, an information processing system including a robot being one or more robots, and an information processing apparatus connectable with the robot via a network is devised. The robot includes a three-dimensional shape detecting sensor to detect a three dimensional shape of a travel surface existing in a forward travelling direction of the robot, a posture stabilizer to stabilize a posture of a body of the robot, a feature data generator to generate feature data of the detected three dimensional shape, and to transmit the generated feature data to the information processing apparatus, and an overturn prevention controller to control the posture stabilizer to prevent an overturn of the robot. The information processing apparatus includes an inclination angle prediction generator to generate a prediction value of an inclination angle of the body when the robot is to reach a position on the travel surface in the forward travelling direction at a future time point based on the feature data received from the robot and a prediction model, and to transmit the generated prediction value to the robot. The overturn prevention controller of the robot controls the posture stabilizer to prevent an overturn of the robot based on the prediction value received from the information processing apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1 illustrates schematic views of a robot according to an example embodiment, in which

FIG. 2 illustrates a schematic configuration of another robot according to an example embodiment, in which

FIG. 3 illustrates an example of a posture stabilizer, in which

FIG. 6 is a flowchart illustrating the steps of generating learning data;

FIG. 7 illustrates a schematic configuration of a training phase of the robot according to one or more example embodiments, in which

Figure 8A:
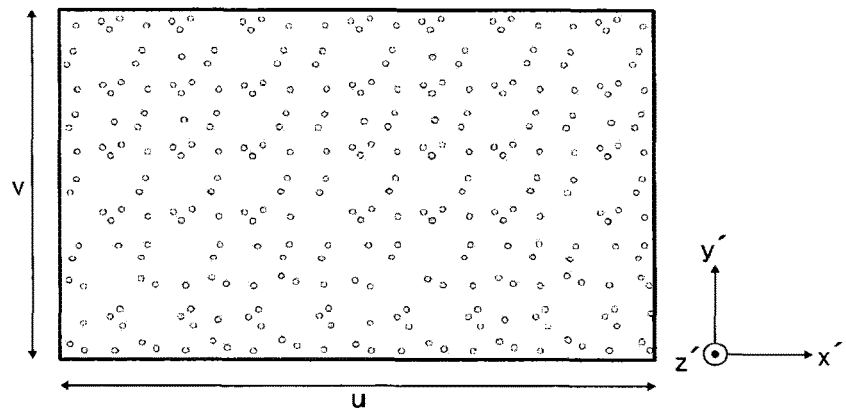
Figure 8B:
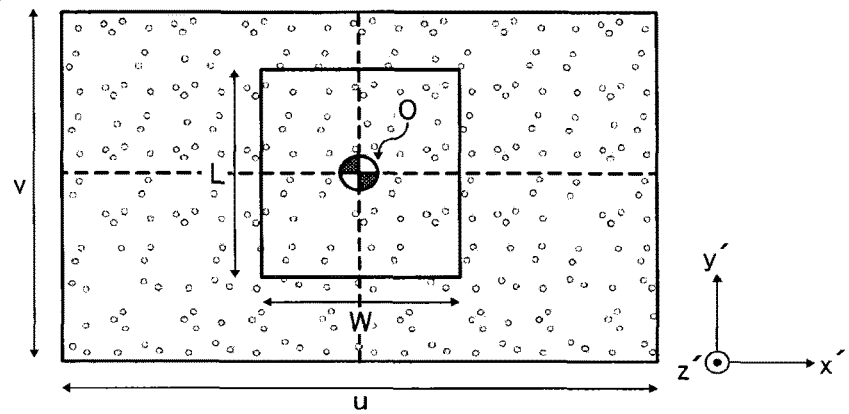
Figure 8C:
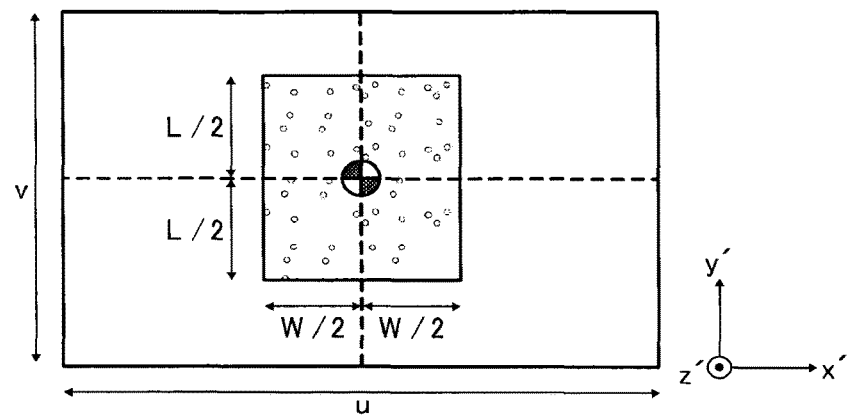
Figure 9A:
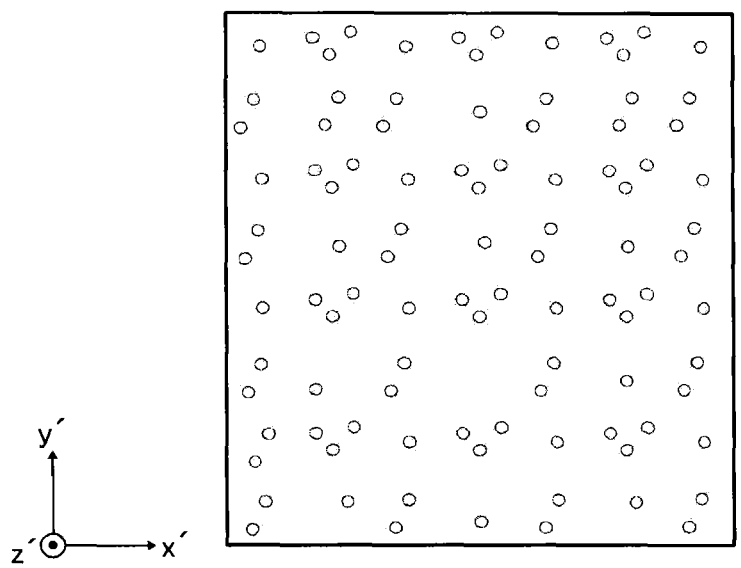
Figure 9B:
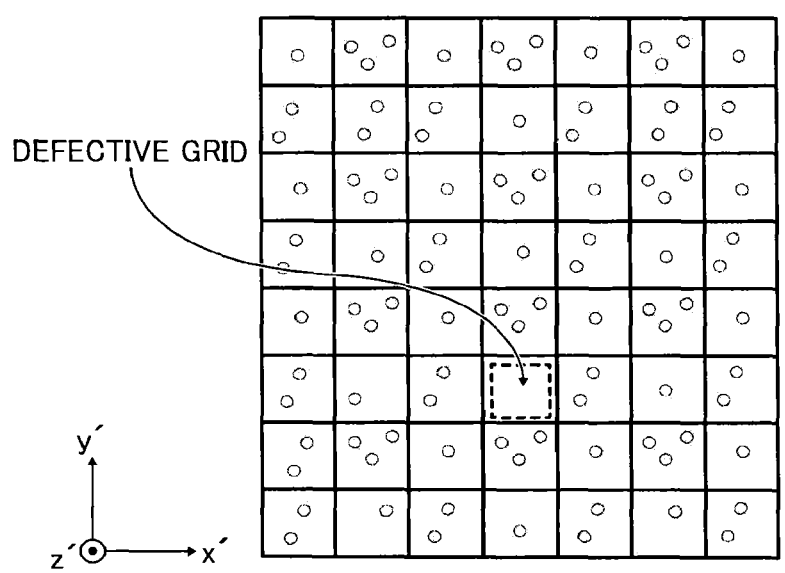
Figure 9C:
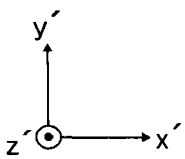
Figure 9D:
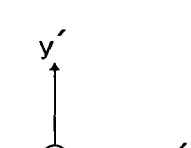
Figure 11A:
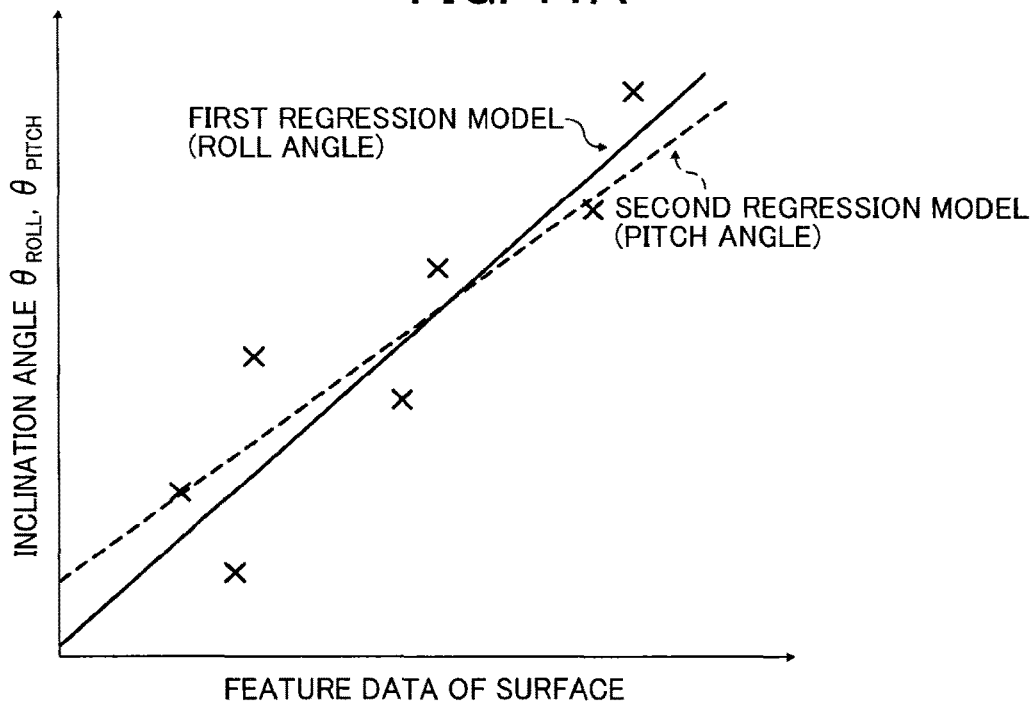
Figure 11B:
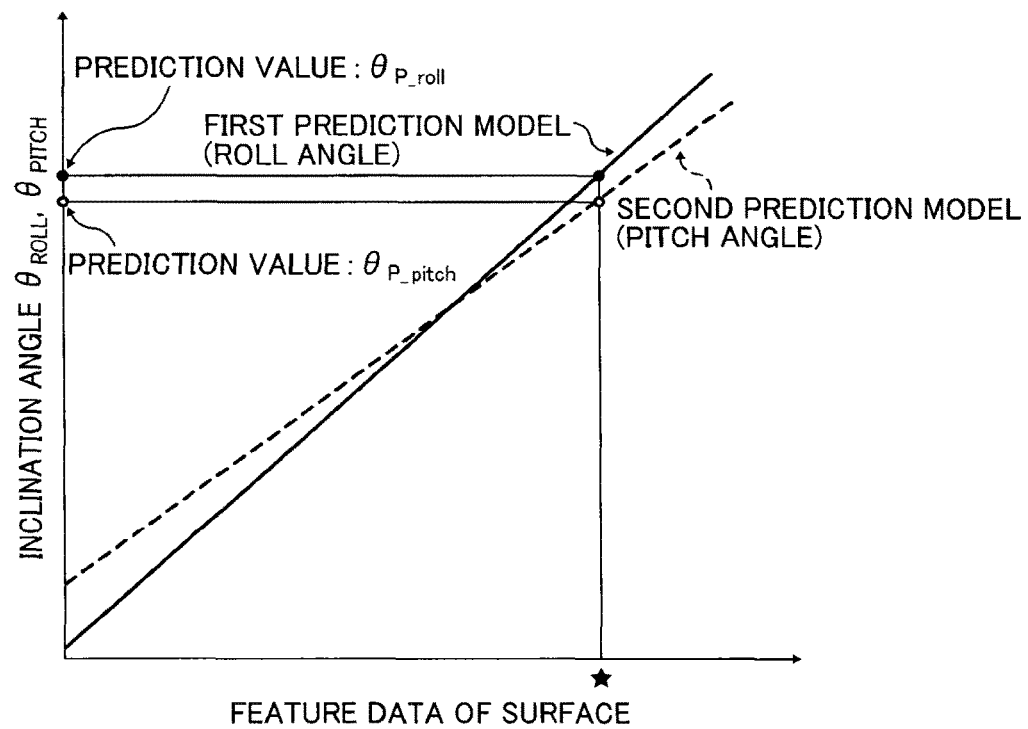
Figure 12:
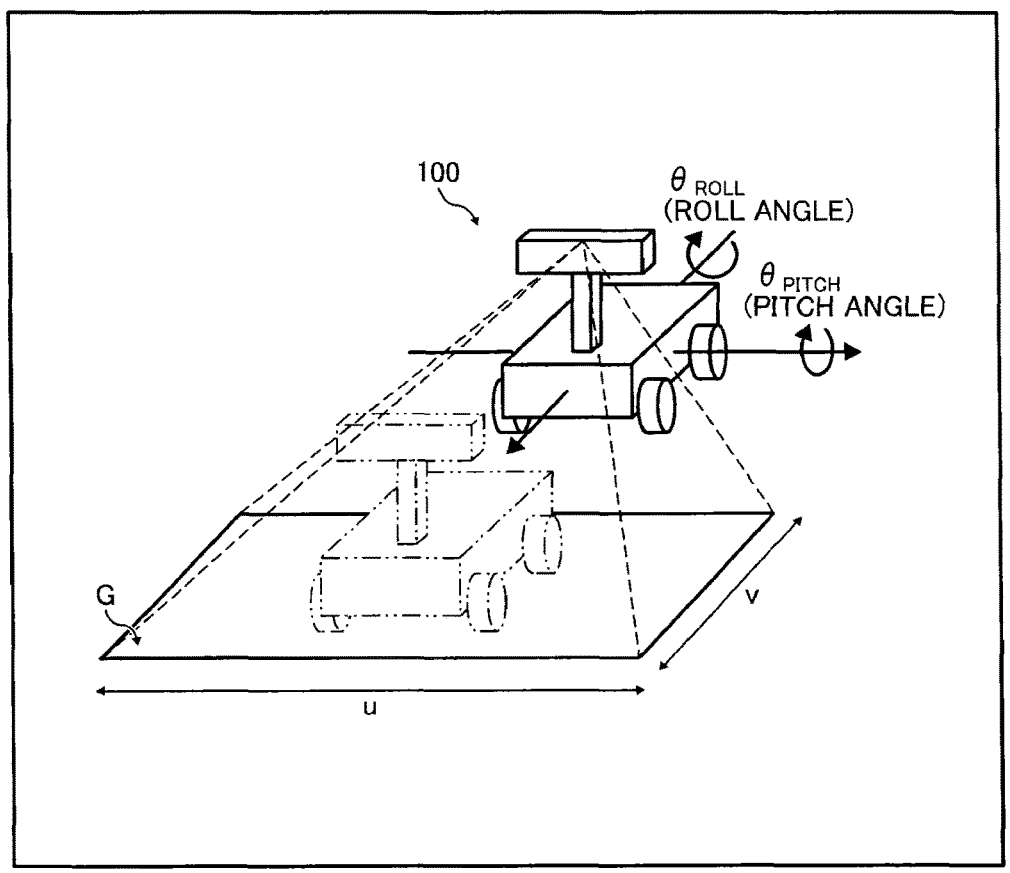
Figure 13:
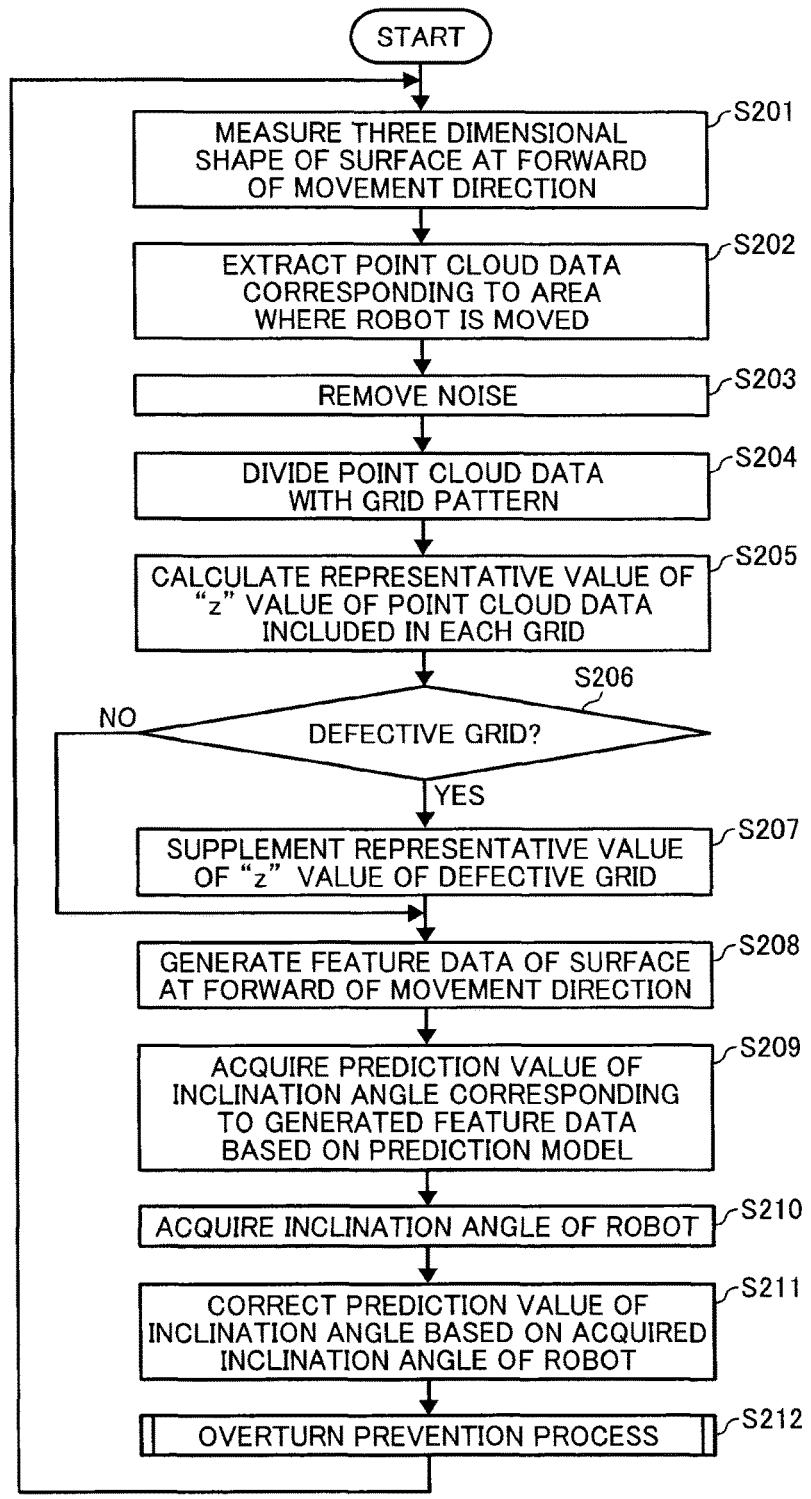
Figure 14A:
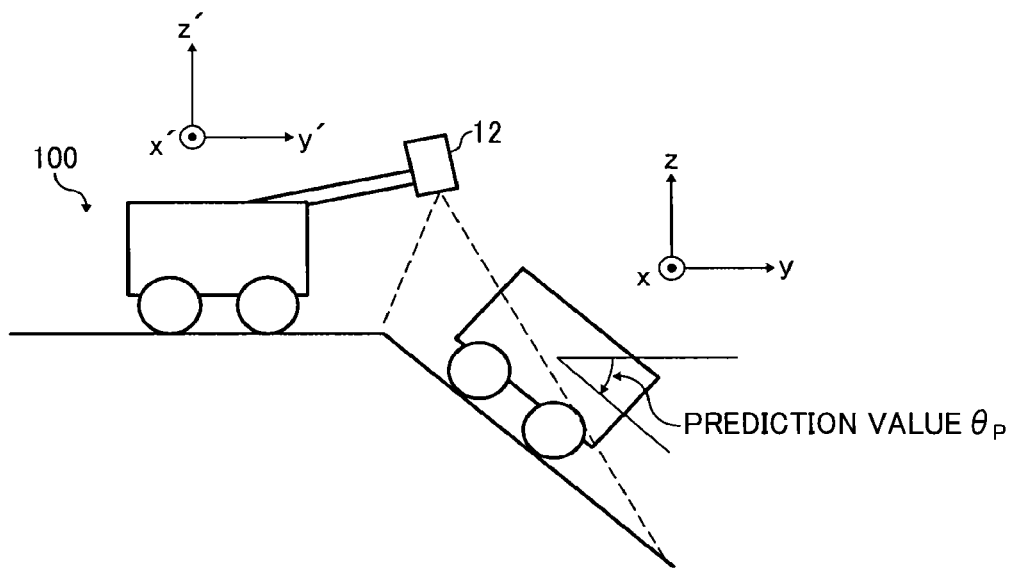
Figure 14B:
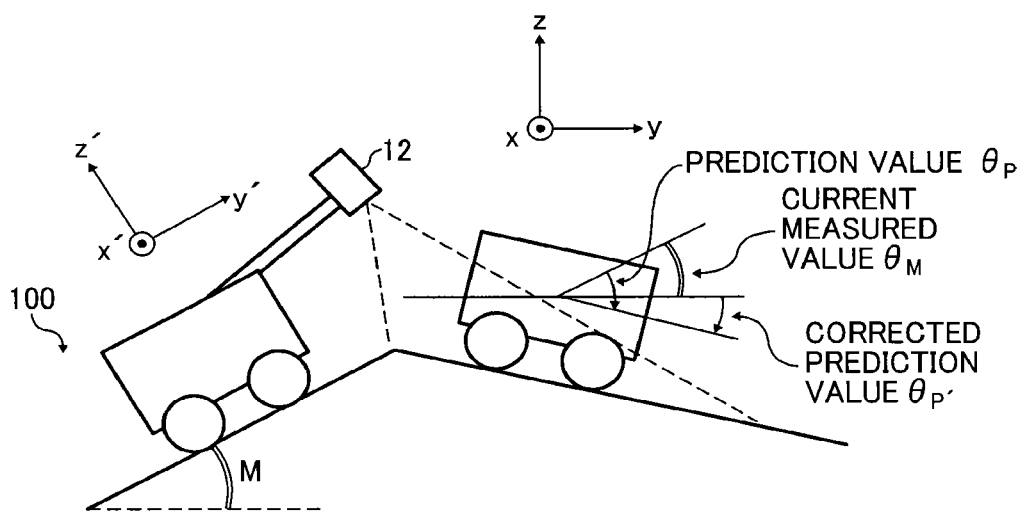
Figure 15:
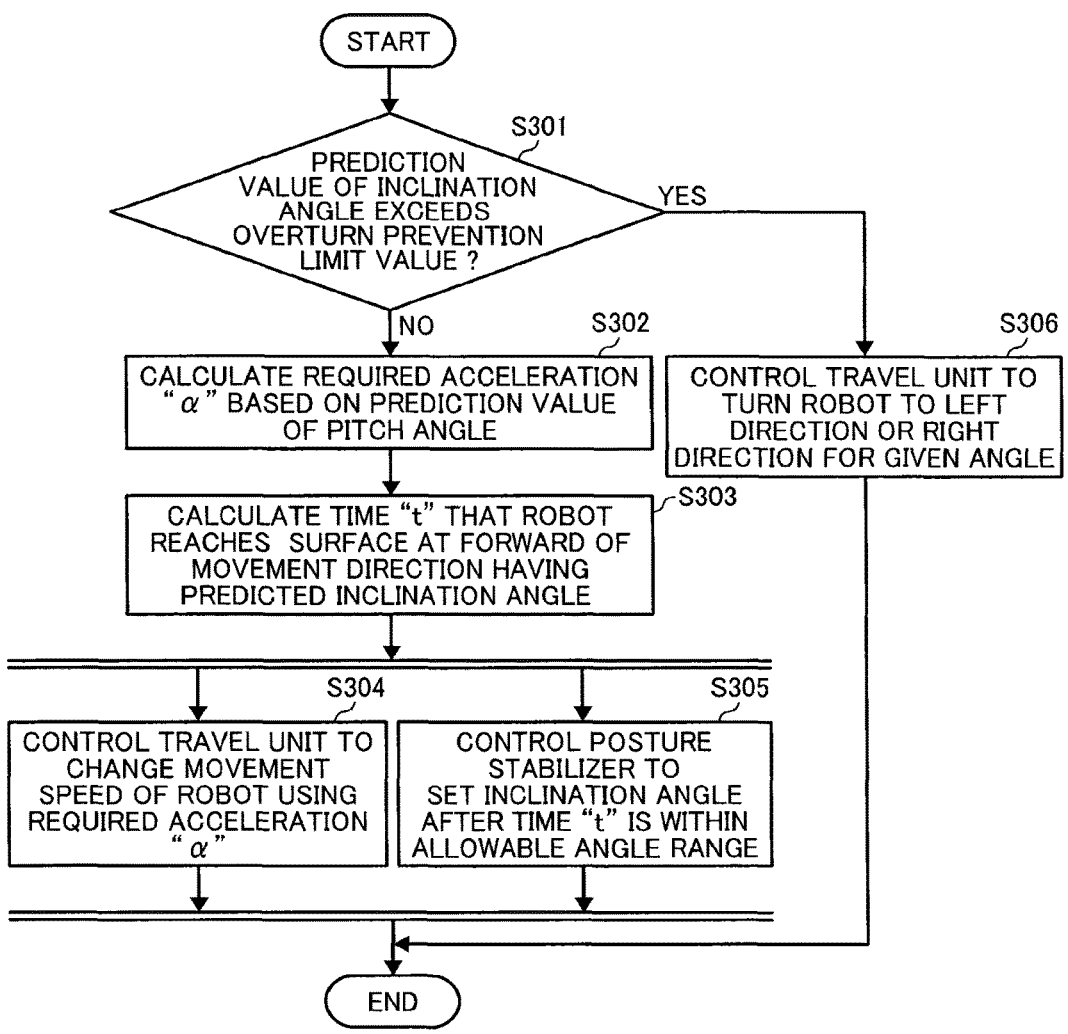
Figure 16A:
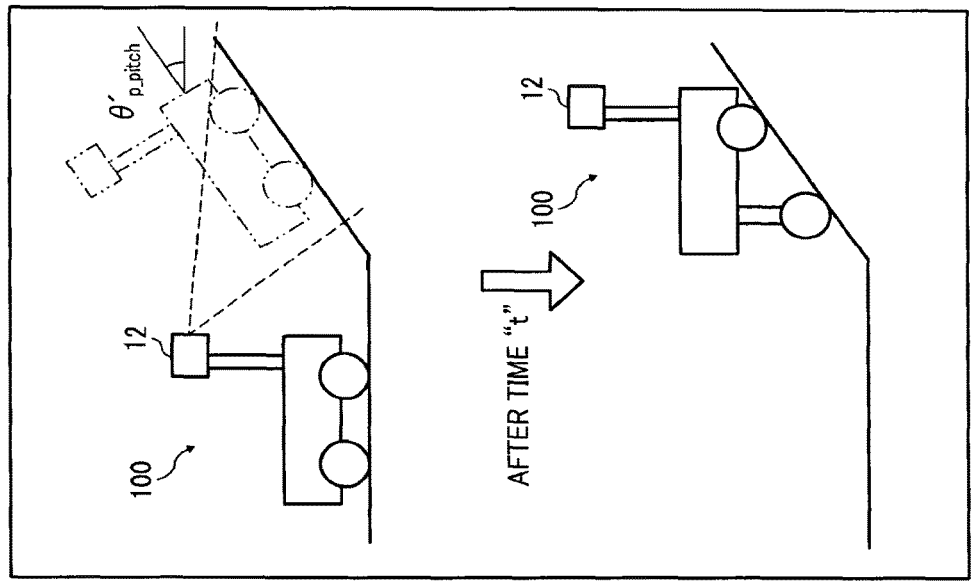
Figure 16B:
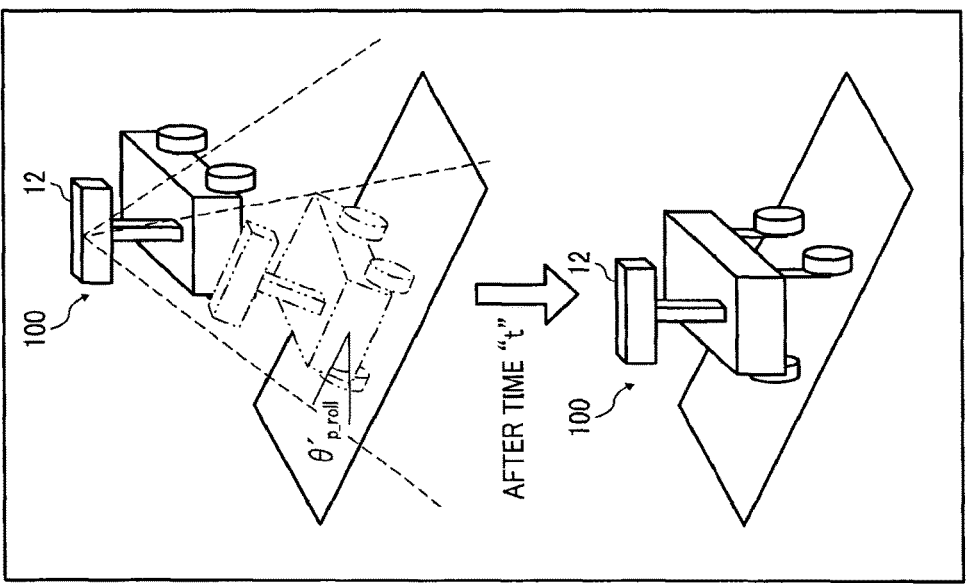
Figure 17:
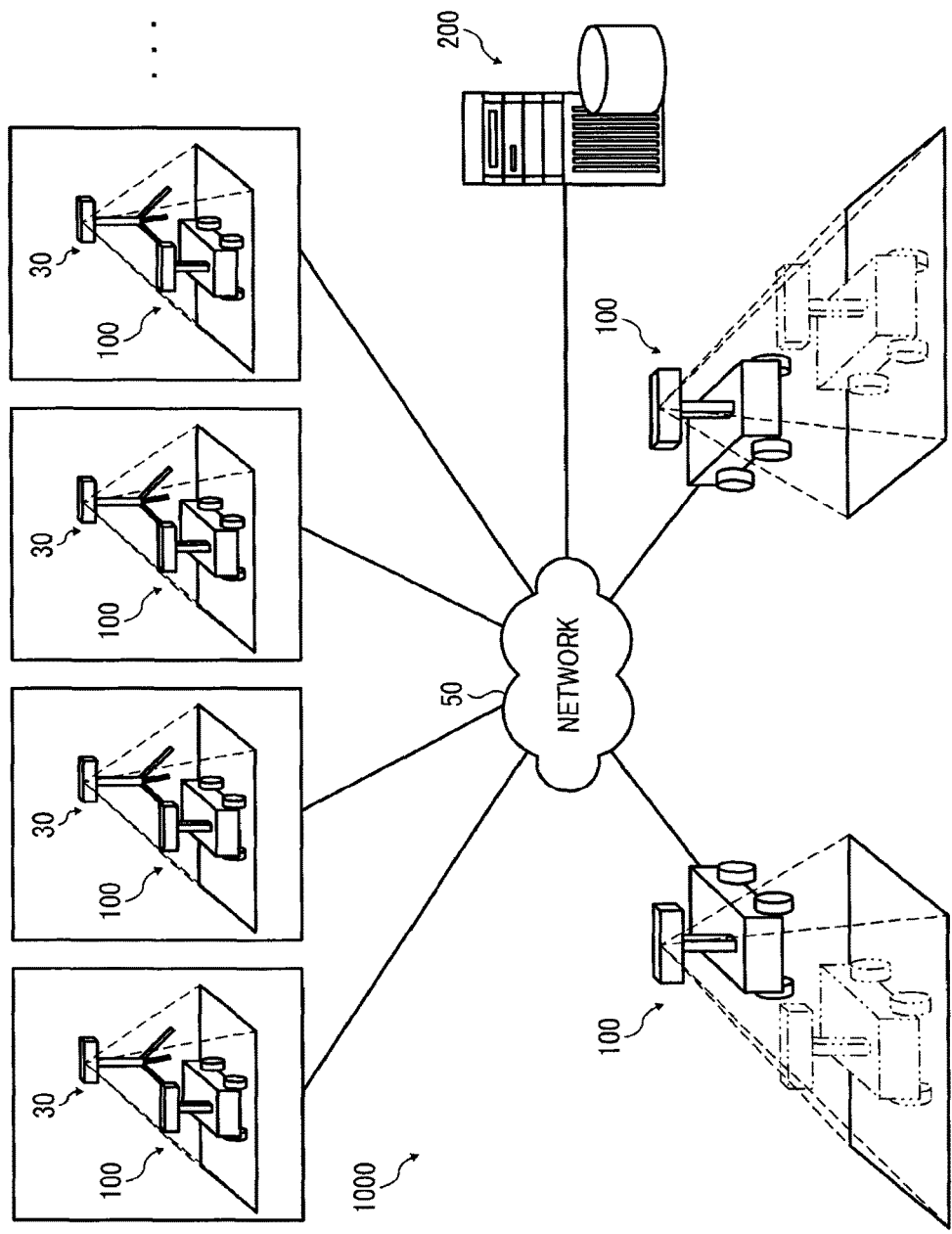
Figure 18:
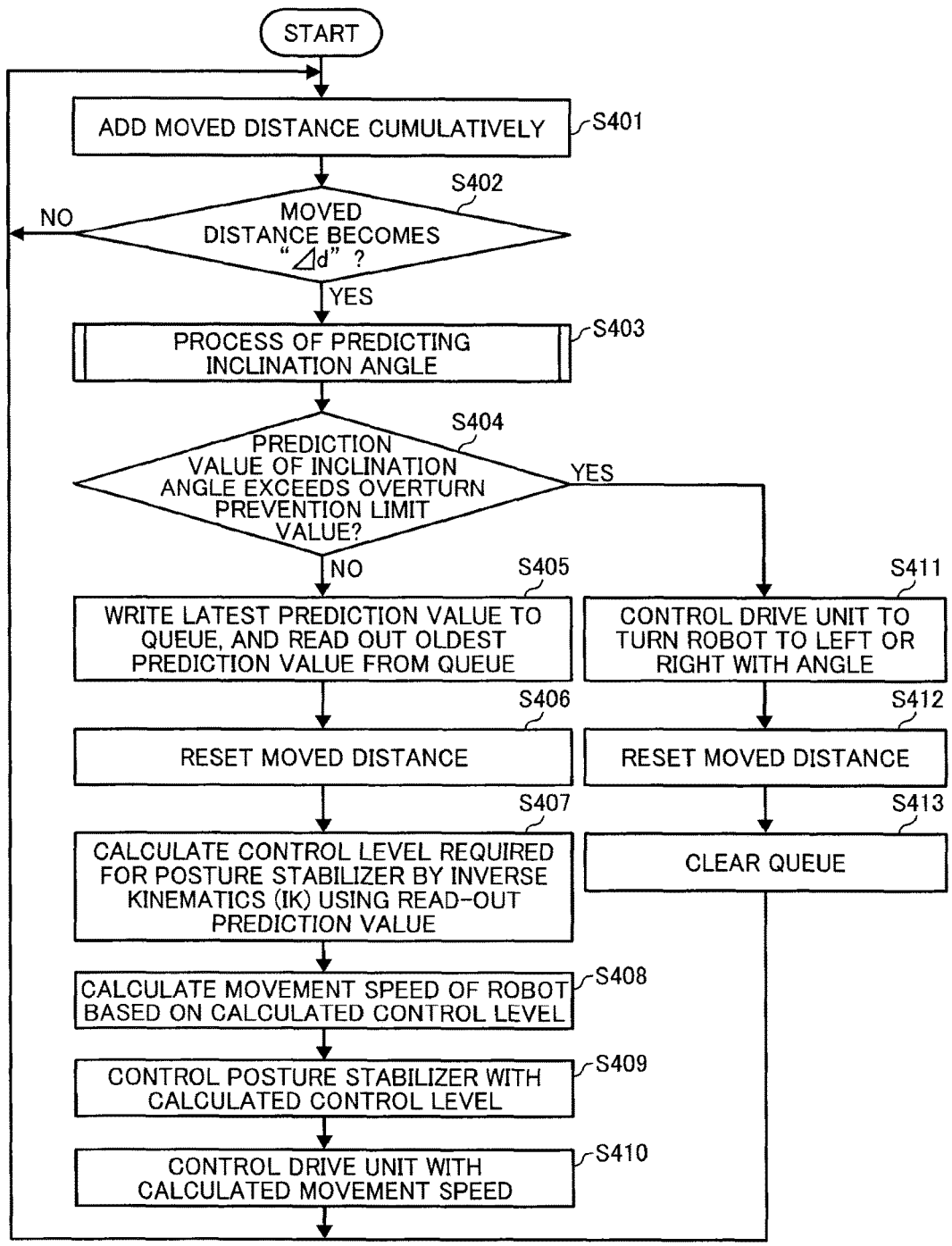

7B illustrates a situation that the robot is moved on a measurement area of the travel surface;

FIG. 8 schematically illustrates a process performed by a feature data generator, in which FIG. 8A illustrates an example of three dimensional shape data of the travel surface acquired by the surface shape measurement apparatus, FIG. 8B illustrates a situation that the center of the measurement area of the travel surface and the center of gravity of the robot are matched with each other, and FIG. 8C illustrates a situation that some of point cloud data is remained while some of point cloud data is deleted;

FIG. 9 schematically illustrates a process performed by the feature data generator in detail, in which FIG. 9A illustrates a situation that 3D point cloud data is acquired, FIG. 9B illustrates a situation that the 3D point cloud data is divided into grids, FIG. 9C illustrates a situation that a representative value of each grid is acquired, and FIG. 9D illustrates a situation that a representative value of each grid is acquired by performing a supplementing process to a defective grid;

FIG. 10 schematically illustrates a learning data set of roll angle and a learning data set of pitch angle;

FIG. 11A illustrates an example of a first regression model and a second regression model, and FIG. 11B illustrates a situation that an inclination angle prediction generator acquires a prediction value of inclination angle and a prediction value of pitch angle;

FIG. 12 illustrates a schematic configuration of a real movement phase of the robot according to one or more example embodiments;

FIG. 13 is a flowchart illustrating the steps of processes performed for a real movement phase;

FIGS. 14A and 14B illustrate schematic situations that a prediction correction unit predicts a prediction value of the inclination angle;

FIG. 15 is a flowchart illustrating the steps of an overturn prevention process performed by an overturn prevention controller;

FIG. 16A illustrates a case that a posture stabilizer is controlled to cancel a predicted inclination along a roll angle direction, and FIG. 16B illustrates a case that the posture stabilizer is controlled to cancel a predicted inclination along a pitch angle direction;

FIG. 17 illustrates a network system for multiple robots according to one or more example embodiments;

FIG. 18 is a flowchart illustrating the steps of a control process for the real movement phase of the robot; and FIGS. 19A, 19B, 19C, 19D and 19E schematically illustrate the control process for the real movement phase of the robot.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, apparatus or system according to one or more example embodiments are described hereinafter.

Figure 1A:
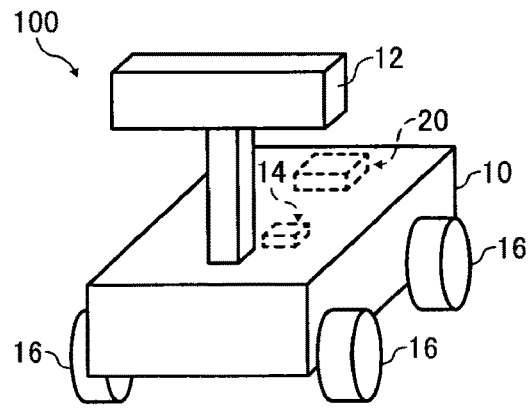
FIG. 1A illustrates a perspective view of the robot.
Figure 1B:
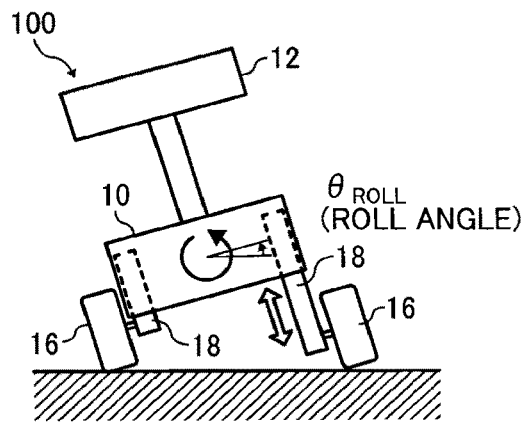
FIG. 1B illustrates a front view of the robot.
Figure 1C:
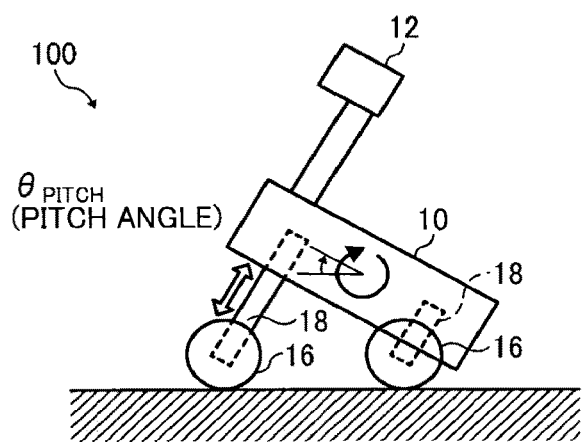
FIG. 1C illustrates a side view of the robot.

A description is given of a robot according to one or more example embodiments are described hereinafter. FIG. 1 illustrates schematic views of a robot 100 according to one or more example embodiments. FIG. 1A illustrates a perspective view of the robot 100, FIG. 1B illustrates a front view of the robot 100, and FIG. 1C illustrates a side view of the robot 100.

The robot 100 illustrated in FIG. 1 is an example of unmanned vehicles such as autonomous mobile robots that can move autonomously. As illustrated in FIG. 1, the robot 100 includes, for example, a body 10, a drive unit 16, a three-dimensional shape detecting sensor 12, an inclination angle sensor 14, a posture stabilizer 18, and a computer 20. The drive unit 16 moves the body 10 of the robot 100 to cause the robot 100 to travel. The three-dimensional shape detecting sensor 12 measures or detects a three dimensional shape of a travel surface around the robot 100 such as a travel surface existing in a forward travelling direction of the robot 100. The travel surface is any types of surface where the robot 100 moves or travels such as a terrain surface. The inclination angle sensor 14 measures or detects the inclination angle of the body 10. The posture stabilizer 18 stabilizes the posture of the robot 100. The computer 20 controls the autonomous moving or travelling of the robot 100.

The three-dimensional shape detecting sensor 12 can employ any types of sensor that can measure or detect the three dimensional shape of the travel surface around the robot 100 such as the travel surface existing in the forward travelling direction of the robot 100. The three-dimensional shape detecting sensor 12 can employ, for example, a three dimensional laser range finder, a stereo camera or the like.

The inclination angle sensor 14 can employ any types of sensor that can measure or detect the inclination angle of the body 10 such as the roll angle and the pitch angle of the body 10. The inclination angle sensor 14 can employ, for example, a gyro sensor or the like.

The drive unit 16 can employ any types of drive unit that can move or travel the body 10 into a desired travelling direction. In this disclosure, the drive unit 16 employs, for example, a four-wheel independent drive mechanism, but not limited hereto. For example, the drive unit 16 can employ a front wheel drive mechanism or a rear wheel drive mechanism connected to a steering gear, or a crawler mechanism connected to a steering gear.

The posture stabilizer 18 can employ any types of stabilizer having a mechanism that can stabilize the posture of the robot 100 to prevent an overturn of the robot 100. In this example case, the posture stabilizer 18 employs, for example, four actuators 18, which may be telescoping actuators disposed for the respective ones of four wheels. Here, each one of the four actuators 18 is disposed for the axis of each one of the four wheels, which can be driven independently, and each one of the actuators 18 can be independently controlled for telescoping each one of the actuators 18.

As illustrated in FIG. 1B, the roll angle of the body 10 can be changed by setting a first length to the actuator 18 at one side (e.g., right side) of the body 10 and a second length, different from the first length, to the actuator 18 at the opposite side (e.g., left side) of the body 10 with respect to the right-to-left of travelling direction. As illustrated in FIG. 1C, the pitch angle of the body 10 can be changed by setting a third length to the actuator 18 at one side (e.g., front side) of the body 10 and a fourth length, different from the third length, to the actuator 18 at the opposite side (e.g., rear side) of the body 10 with respect to the front-to-rear of travelling direction. Further, the posture stabilizer 18 can employ other units that can change the inclination angle of the body 10, and the other units that can move the center of gravity of the robot 100.

Figure 2A:
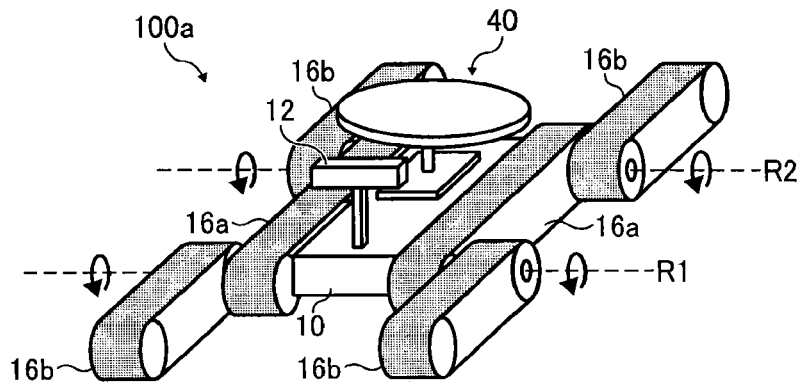
FIG. 2A illustrates a perspective view of another robot.
Figure 2B:
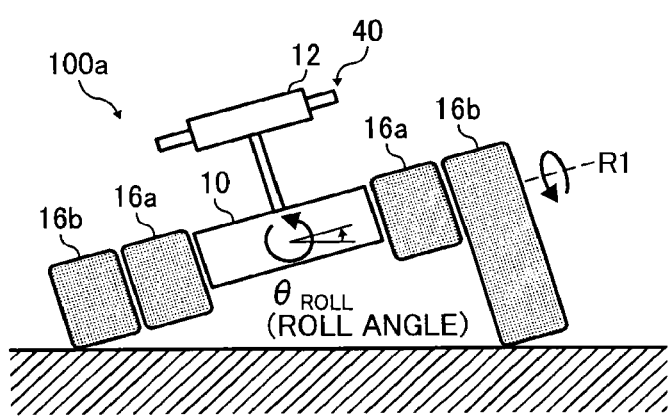
FIG. 2B illustrates a front view of another robot.
Figure 2C:
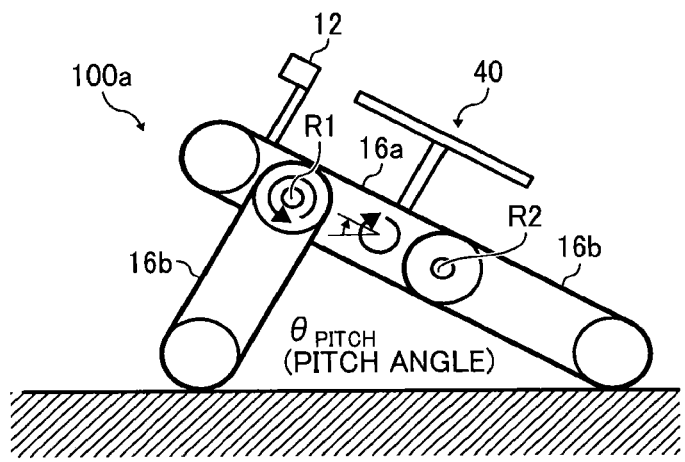
FIG. 2C illustrates a side view of another robot.

FIG. 2 illustrates a schematic configuration of another robot 100a including a posture stabilizer such as a gravitational position control unit 40 that can shift the gravitational position, and the drive unit 16 such as crawler mechanisms 16a and 16b. FIG. 2A illustrates a perspective view of the robot 100a, FIG. 2B illustrates a front view of the robot 100a, and FIG. 2C illustrates a side view of the robot 100a.

As illustrated in FIG. 2, the robot 100a includes a pair of first crawler mechanisms 16a as a main drive unit, and a plurality of second crawler mechanisms 16b useable as movable arms or legs. For example, as illustrated in FIG. 2, a pair of second crawler mechanisms 16b are attached to each one of the first crawler mechanisms 16a. One of the crawler mechanisms 16b is disposed to one first crawler mechanism 16a, and the second crawler mechanism 16b is rotatable about a rotation axis R1. Another one of the crawler mechanisms 16b is disposed to another first crawler mechanism 16a, and the crawler mechanism 16b is rotatable about a rotation axis R2.

Figure 3A:
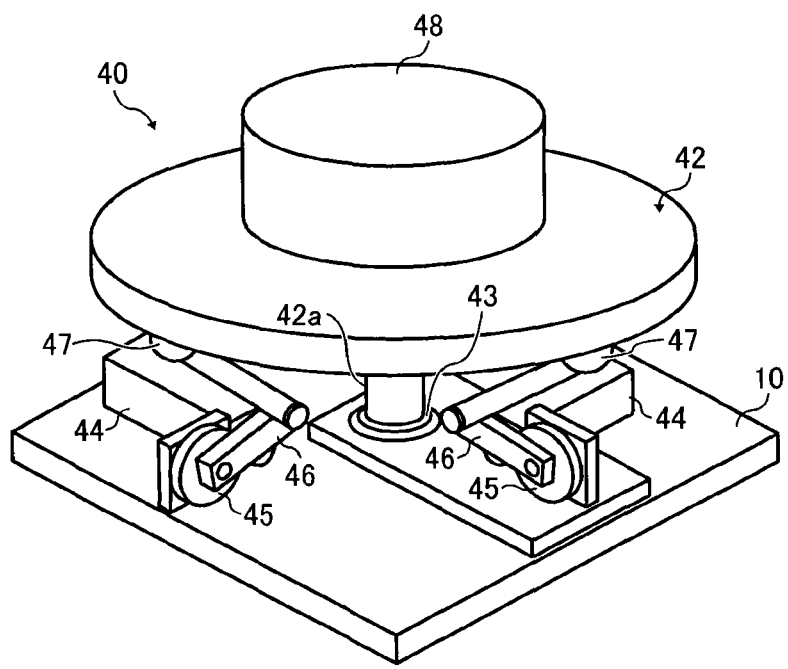
FIG. 3A illustrates a perspective view of the posture stabilizer.
Figure 3B:
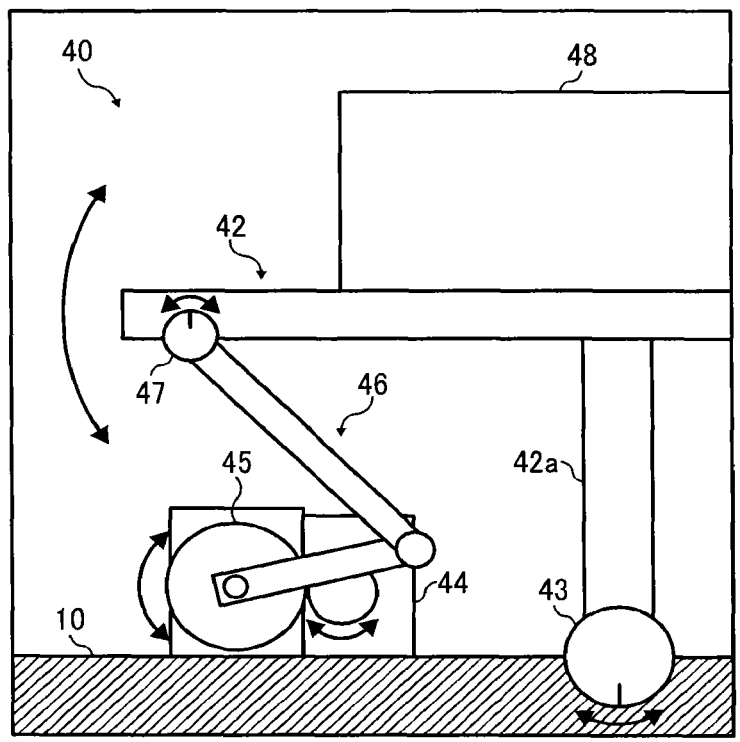
FIG. 3B illustrates a side view of the posture stabilizer.

FIG. 3 illustrates an example of the gravitational position control unit 40. FIG. 3A illustrates a perspective view of the gravitational position control unit 40, and FIG. 3B illustrates a side view of the gravitational position control unit 40. As illustrated in FIG. 3, the gravitational position control unit 40 includes a tilt table 42 and a link mechanism. The tilt table 42 can be loaded with a weight 48 or transport goods. The link mechanism can be used to change the inclination angle of the tilt table 42 such as the roll angle and the pitch angle with respect to the upper face of the body 10. Since the tilt table 42 is connected with the body 10 by a support pole 42a and a ball joint 43, the tilt table 42 is tilt-able to all directions. Further, the link mechanism of the gravitational position control unit 40 can include a first link mechanism to change the roll angle and a second link mechanism to change the pitch angle.

Each of the first and second link mechanisms includes a stepping motor 44, a spur gear 45 and a link 46. Specifically, one end of the link 46 is fixed to the spur gear 45, and the other end of the link 46 is fixed to a back face of the tilt table 42 via a ball joint 47. As to the one or more example embodiments, as illustrated in FIG. 3B, when the stepping motor 44 rotates in one direction, the spur gear 45 rotates in one direction. When the spur gear 45 rotates, the link 46 linking the spur gear 45 and the tilt table 42 expands or shrinks to change the roll angle and/or the pitch angle of the tilt table 42. As to the one or more example embodiments, when the robot 100a is moving on a uphill surface and a downhill surface, the table face of the tilt table 42 can be maintained at the horizontal direction by employing the above described link mechanism while changing the gravitational position of the entire of the robot 100a including the weight 48. Therefore, the overturn of the robot 100a can be evaded or prevented.

Further, if the transport goods that can be used as the weight 48 is not loaded on the tilt table 42, and/or the overturn of the robot 100a cannot be evaded just by changing the gravitational position of the robot 100a, as illustrated in FIGS. 2B and 2C, at least one of the crawler mechanisms 16b (i.e., movable arms or legs) can be rotated with a required angle to change the roll angle and the pitch angle of the body 10, with which the overturn of the robot 100a can be evaded or prevented. In this case, the crawler mechanism 16b (i.e., movable arm or leg) and the gravitational position control unit 40 can be collectively used as the posture stabilizer.

Figure 4:
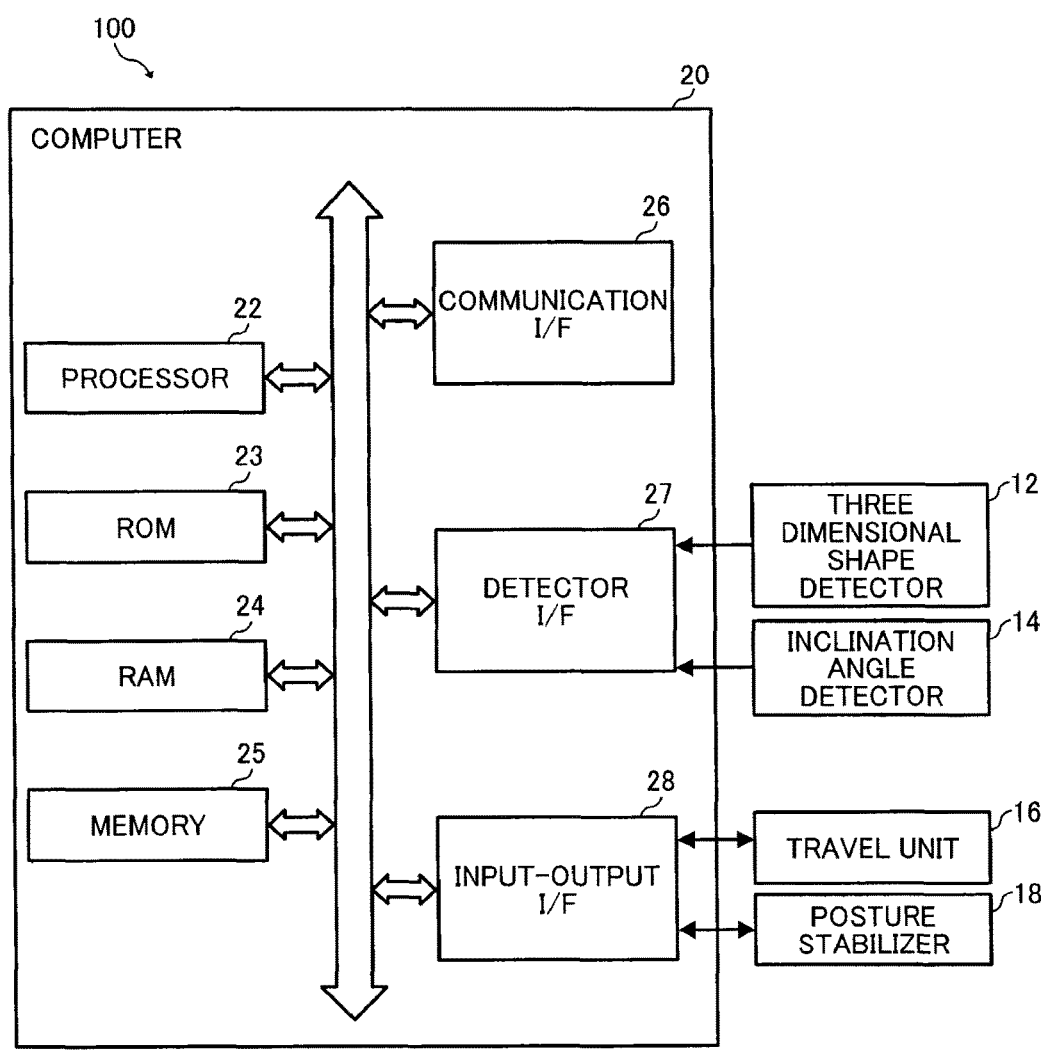
FIG. 4 is a hardware configuration of a computer used for the robot.

A description is given of a hardware configuration of the computer 20 used for the robot 100 with reference to FIG. 4. As illustrated in FIG. 4, the computer 20 disposed or used for the robot 100 includes, for example, a central processing unit (CPU) 22, a read only memory (ROM) 23, a random access memory (RAM) 24, a memory 25, a communication interface (I/F) 26, a sensor interface (I/F) 27, and an input-output interface (UF) 28. The central processing unit (CPU) 22 controls the robot 100 as a whole. The read only memory (ROM) 23 stores programs such as a boot program and firmware programs. The random access memory (RAM) 24 provides a memory space for executing programs. The memory 25 stores operating system (OS), various applications, and data. The communication I/F 26 is used to input and output signals wirelessly or via wire. The sensor I/F 27 receives detection signals such as sensor signals transmittable from the three-dimensional shape detecting sensor 12 and the inclination angle sensor 14 wirelessly or via wire. The input-output I/F 28 communicates control signals with the drive unit 16 and the posture stabilizer 18 wirelessly or via wire. Each of the to-be-described later functional units can be devised by executing given programs using the computer 20 under the control of a given OS.

Figure 5:
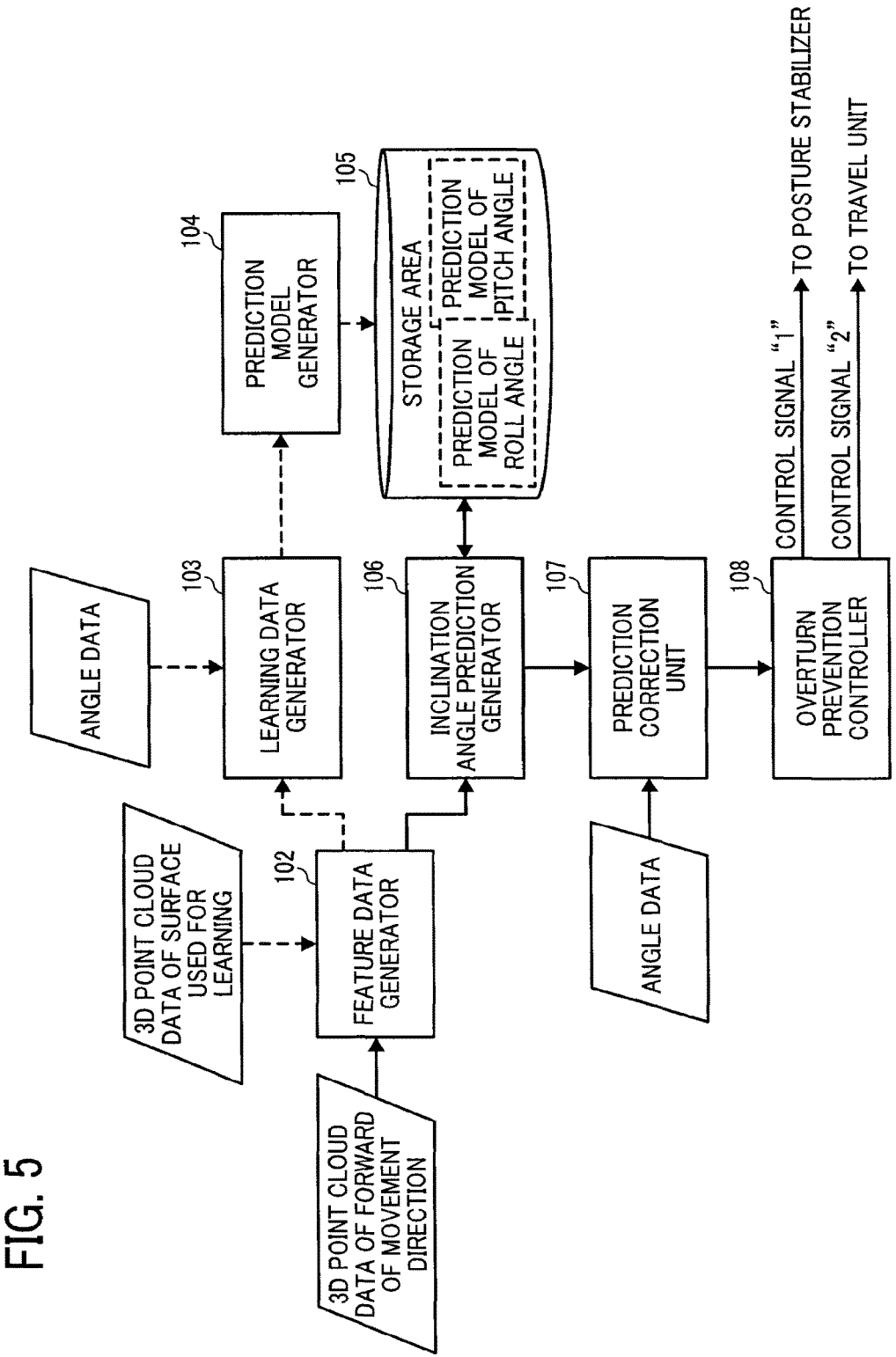
FIG. 5 is a bock diagram of functional units of the robot devised by a computer according to one or more example embodiments.

A description is given of functional units of the robot 100 devisable by the computer 20 with reference to FIG. 5, which is a functional block diagram of the robot 100.

As illustrated in FIG. 5, the robot 100 includes, for example, a feature data generator 102, a learning data generator 103, a prediction model generator 104, an inclination angle prediction generator 106, a prediction correction unit 107, and an overturn prevention controller 108.

The feature data generator 102 generates feature data of the three dimensional shape of the travel surface measured or detected by the three-dimensional shape detecting sensor 12.

The learning data generator 103 generates a combination of the inclination angle of the body 10 measured or detected by the inclination angle sensor 14 and the feature data of the three dimensional shape of the travel surface generated by the feature data generator 102 as learning data of machine learning.

The prediction model generator 104 generates a prediction model for predicting the inclination angle of the body 10 when the robot 100 is to reach a position on the travel surface in the forward travelling direction at a future time point. The prediction model generator 104 has a learning capability to perform the machine learning based on the learning data generated by the learning data generator 103.

Based on the feature data of the three dimensional shape of the travel surface in the forward travelling direction generated by the feature data generator 102, and the prediction model generated by the prediction model generator 104, the inclination angle prediction generator 106 generates a prediction value of the inclination angle of the body 10 when the robot 100 is to reach the position on the travel surface in the forward travelling direction at the future time point.

The prediction correction unit 107 corrects the prediction value of the inclination angle of the body 10 generated by the inclination angle prediction generator 106 based on the inclination angle of the body 10 acquired by the inclination angle sensor 14.

The overturn prevention controller 108 controls at least one of the drive unit 16 and the posture stabilizer 18 based on the prediction value or the corrected prediction value of the inclination angle of the body 10 to prevent or evade the overturn of the body 10.

Hereinafter, a description is given of processes performable by the above described functional units of the body 10 for a "training phase" and a "real movement phase" separately. The "training phase" is a phase of the machine learning of a travelling environment by the robot 100, and the "real movement phase" is a phase of actual autonomous travelling of the robot 100 by using the results of the machine learning. The description is given by referring FIGS. 4 and 5 as required.

(Training Phase)

As to the training phase, the robot 100 generates a prediction model by performing the machine learning for the travelling environment. The prediction model employs, for example, a regression model using the feature data of the travel surface as an explanatory variable, and the inclination angle of the body 10 when the robot 100 is to reach the position on the travel surface in the forward travelling direction at a future time point as a response variable. The robot 100 can generate a prediction model of the inclination angle based on the machine learning having a teacher.

A description is given of a process of generating the learning data used for the machine learning having the teacher with reference to FIG. 6, which is a flowchart illustrating the steps of generating the learning data.

Figure 7A:
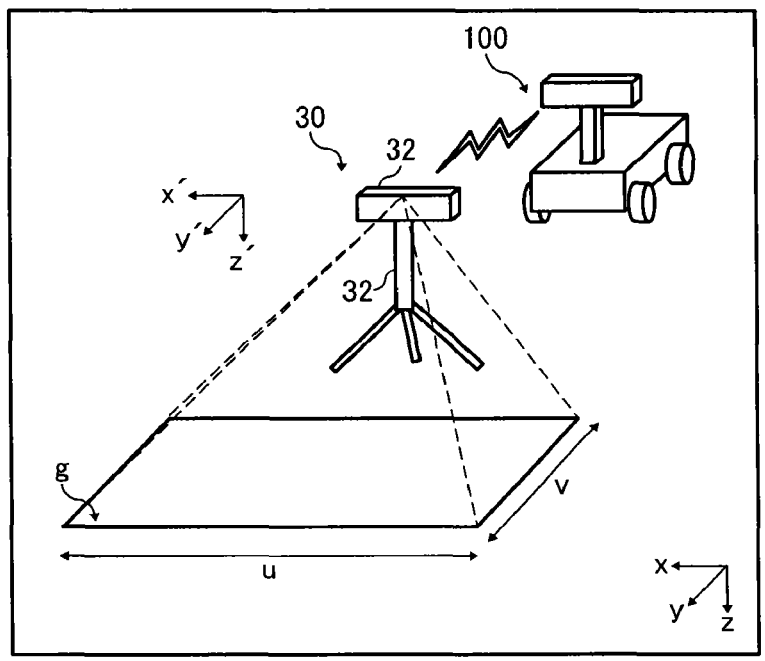
FIG. 7A illustrates situation that a surface shape measurement apparatus is placed at a position where the surface shape measurement apparatus can measure a travel surface used for a machine learning, and FIG.

At step S101, the three dimensional shape of a travel surface used for learning is measured or detected. Specifically, as illustrated in FIG. 7A, a surface shape measurement apparatus 30 is placed at a position where the surface shape measurement apparatus 30 can measure a travel surface "g" used for the machine learning. The surface shape measurement apparatus 30 includes, for example, a three-dimensional shape detecting sensor 32 having the same capability of the three-dimensional shape detecting sensor 12 of the robot 100, and a supporter 34 that supports the three-dimensional shape detecting sensor 32.

At step S101, the supporter 34 is adjusted at a position to match the x'-y' plane of the sensor coordinate system of the three-dimensional shape detecting sensor 32, indicated by three dimensional orthogonal coordinate system of x'y'z', and the x-y plane of the world coordinate system, indicated by three dimensional orthogonal coordinate system of xyz setting the vertical direction as the z-axis, and while the three-dimensional shape detecting sensor 32 is fixed at this position, a surface shape of the travel surface "g" used for the machine learning is measured or detected. At step S101, a measurement area of (v×u) to be measured by the three-dimensional shape detecting sensor 32 is set greater than the bottom face area of the robot 100 defined by length "L"× width "W." Further, the position of the three-dimensional shape detecting sensor 12 of the robot 100 is adjusted at a position to match the x"-y" plane of the sensor coordinate system of the three-dimensional shape detecting sensor 12 of the robot 100, indicated by three dimensional orthogonal coordinate system of x"y"z", and the x'-y' plane of the sensor coordinate system of the three-dimensional shape detecting sensor 32.

FIG. 8A is an example of three dimensional shape data of the travel surface "g" acquired by the surface shape measurement apparatus 30. As illustrated in FIG. 8A, the three dimensional shape data of the travel surface "g" can be acquired as a collection of a number of data points, in which each data point has the three dimensional coordinates (x", y',z'). Hereinafter, the collection of the number of data points is collectively referred to "three dimensional (3D) point cloud data" as required.

As illustrated in FIG. 7A, the 3D point cloud data of the travel surface "g" acquired by the surface shape measurement apparatus 30 can be transferred to the robot 100 wirelessly or via wire, and then the robot 100 stores the received 3D point cloud data of the travel surface "g" to a storage area 105.

Figure 7B:
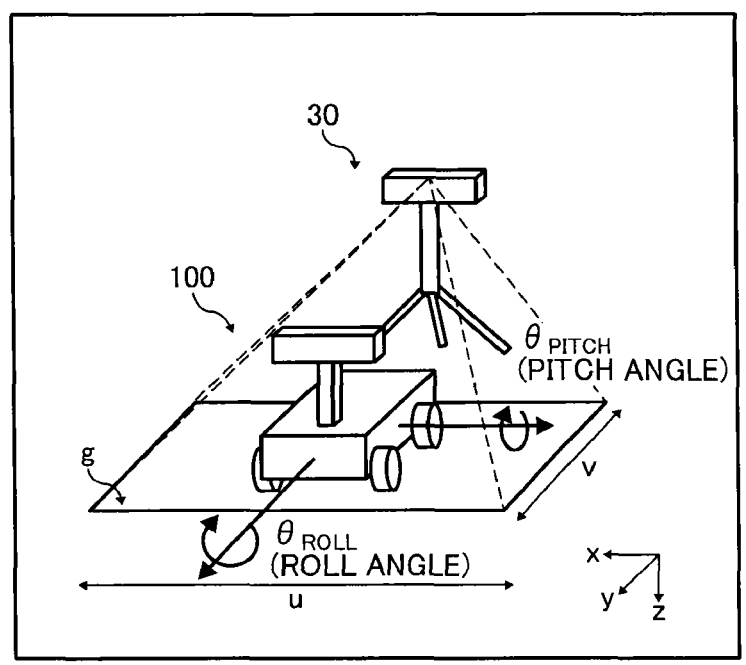

At step S102, as illustrated in FIG. 7B, the robot 100 is moved on the measurement area (v×u) of the travel surface "g" to measure or detect an inclination angle of the robot 100. Specifically, when the center of the measurement area (v×u) of the travel surface "g" and the center of gravity "O" of the robot 100 are matched with each other as illustrated in FIG. 8B, the robot 100 stores the inclination angle (i.e., roll angle and pitch angle) detected by the inclination angle sensor 14 to the storage area 105.

Specifically, step S102 can be performed as follows. For example, the center of gravity "O" of the robot 100 is marked in advance by a suitable method while the three-dimensional shape detecting sensor 32 employing a stereo camera is being fixed at the position indicated in FIG. 7A. Then, while an operator is viewing images captured by the stereo camera while the robot 100 is being moved, a position matching of a marked gravity position of the robot 100 and the center of the measurement area (v×u) is performed by the operator so that the marked gravity position of the robot 100 and the center of the measurement area (v×u) can be matched with each other.

Then, the feature data generator 102 performs the processing at steps S103 to S109.

At step S103, the 3D point cloud data of the travel surface "g" stored at step S101 is read out from the storage area 105, and then the point cloud data corresponding to a robot area where the robot 100 is being moved on (i.e., area corresponding to the bottom face area of the robot 100 defined by the length "L"×width "W") for measuring or detecting the inclination angle at step S102 is extracted from the read-out 3D point cloud data. Specifically, as illustrated in FIG. 8C, some of the point cloud data is remained while some of the point cloud data is deleted. For example, the point cloud data existing within an area around the center of the measurement area defined by the width of "W/2" to the left and right side from the center of the measurement area in the x' direction, and the length of "L/2" to the left and right side from the center of the measurement area in the y' direction is remained while the point cloud data at other areas is deleted.

Further, the above described steps S102 to S103 can be performed differently as follows. Specifically, when the three-dimensional shape detecting sensor 32 is used to perform the measurement, after the three-dimensional shape detecting sensor 32 is set at an installation position and the three dimensional shape is acquired, a marker that can be identified by human eyes is set automatically or manually. By setting the marker, a rectangular area defined by length "L"×width "W" can be identified, in which the marker that does not affect the acquiring of the shape of travel surface in the rectangular area is used. For example, a rectangular frame having color of higher reflectance can be used. The marker can be set by a person before the measurement of the three dimensional shape, and the travel surface is measured with the marker by keeping the marker within the measurement area of the three-dimensional shape detecting sensor 32. When the robot 100 is moved, the robot 100 is moved to an area having the marker set at the position as above mentioned. In this case, when the marker is set at the position, the center of the measurement area is not required to match with the center of gravity of the robot 100. The extraction process for the robot area can be performed by extracting a rectangular area automatically or by a manual operation based on the position of the marker.

At step S104, noise is removed from the point cloud data extracted at step S103. At step S104, the noise removing process can be performed using the iterative closest points (ICP) algorithm, or the noise removing process can be performed by setting a given threshold range defined by a maximum threshold and a minimum threshold to check the z' value of the three dimensional coordinates of the point cloud data. If the z' values are too high or too low (i.e., the z' values are not within the given threshold range), the z' values are removed as error values, and not used for the subsequent process.

At step S105, the x-y plane of the 3D point cloud data having received the noise removing process at step S104 is divided into a grid pattern. For example, if the 3D point cloud data illustrated in FIG. 9A is acquired at step S104, the 3D point cloud data is divided into "m Y n" grids as illustrated in FIG. 9B.

At step S106, a representative value (e.g., average value) is calculated for the z' values of one or more point cloud data included in each one of the grids. Then, as illustrated in FIG. 9C, the representative value ($z_{1,1}$, $z_{1,2}$, $z_{1,3}$ . . . ) can be acquired for each of the grid.

At step S107, it is checked whether a grid having no point cloud data exists (hereinafter, "defective grid") because grids having no point cloud data may occur due to lack of the 3D point cloud data. If it is determined that the defective grid does not exist (S107: NO), the sequence proceeds to step S109. By contrast, if it is determined that the defective grid exists (S107: YES), the sequence proceeds to step S108.

At step S108, the representative value of the z' value of the defective grid is supplemented. Specifically, the average value of representative values of the z' value calculated for grids adjacent or neighboring to the concerned defective grid can be used as the representative value of the defective grid. FIG. 9D illustrates a case that four grids at the upper, lower, left and right sides of the defective grid are used as the adjacent or neighboring grids to supplement the representative value of the defective grid, but not limited hereto. For example, eight grids around the defective grid can be used as the adjacent or neighboring grids to supplement the representative value of the defective grid. By performing the supplementing process for the defective grid, the representative values ($x_{1,1}$ to $x_{m,n}$) of "m×n" grids can be acquired as illustrated in FIG. 9D.

At step S109, the feature data of the travel surface "g" is generated based on the z' value (i.e., representative value) of "m×n" grids acquired by performing the above described processes. Specifically, the z' values of the "m×n" grids are converted to feature vectors ($z_{1,1}$, $z_{1,2}$, $z_{1,3}$ . . . $z_{m,n}$) of "m×n" dimensions, and the acquired feature vectors are stored in the storage area 105 as the feature data of the travel surface "g."

At step S110, the learning data generator 103 reads out the feature vector ($z_{1,1}$, $z_{1,2}$, $z_{1,3}$ . . . $z_{m,n}$) of "m×n" dimensions of the travel surface "g" stored at step S109 and the inclination angle (i.e., roll angle and pitch angle) stored at step S102 from the storage area 105, and then the learning data generator 103 assigns a label (i.e., teacher signal) of the inclination angle to the read feature vector to generate learning data. In this processing, the learning data generator 103 generates the learning data using the roll angle as the teacher signal, and generates the learning data using the pitch angle as the teacher signal.

The above described sequence of steps S101 to S110 can be repeated until the learning data is generated for "N" types of the travel surfaces used for learning (S111: NO). When the learning data is generated for the entire of the "N" types of the travel surfaces used for the machine learning (S111: YES), the sequence is completed. Further, as to the training phase, the learning data can be also generated from feature data at "N" different areas on the travel surface where the robot 100 actually moves or travels, or the learning data can be generated by preparing artificial models artificially regenerating uneven terrain for "N" types of the travel surfaces and then using the feature data of the travel surface of the artificially regenerated models.

FIG. 10 schematically illustrates a learning data set of the roll angle having the learning data for "N" numbers and a learning data set of the pitch angle having the learning data for "N" numbers generated by the above described processing.

The above described processing relates to the generation of the learning data. A description is given of a process of generating the prediction model.

The prediction model generator 104 receives the learning data set having the sample numbers "N" of the roll angle generated by the above described processing as an input, and outputs a first regression model (i.e. function model) by setting the roll angle (Droll) as a response variable, and the feature data (feature vector) of the travel surface as an explanatory variable. Further, the prediction model generator 104 receives the learning data set having the sample numbers "N" of the pitch angle generated by the above described processing as an input, and outputs a second regression model (i.e. function mode) by setting the pitch angle (θpitch) as a response variable, and the feature data (feature vector) of the travel surface as an explanatory variable. The prediction model generator 104 can be used as a learning unit that can perform algorithms such as support vector machine regression and random forest regression.

FIG. 11A illustrates an example of the first regression model and the second regression model generatable by the prediction model generator 104. The first regression model can be defined by the following equation (1), and the second regression model can be defined by the following equation (2).

$$\theta_{roll} = \alpha_{1,1} z_{1,1} \alpha_{1,2} + z_{1,2} + \ldots + \alpha_{m,n} z_{m,n} + c \quad (1)$$

$$\theta_{pitch} \beta_{1,1} z_{1,1} + \beta_{1,2} z_{1,2} + \ldots + \beta_{m,n} z_{m,n} + d \quad (2)$$

In this example case, a linear model is used for generating the first regression model and the second regression model, but not limited hereto. For example, a non-linear model can be used for generating the first regression model and the second regression model. The first regression model and the second regression model obtained as above described can be respectively stored in the storage area 105 of the memory 25 of the robot 100 as a first prediction model for predicting the roll angle and a second prediction model for predicting the pitch angle.

The above described processing relates to the processing performed for the training phase. A description is given of a process performed for the real movement phase.

(Real Movement Phase)

As illustrated in FIG. 12, when the "real movement phase" is activated, the three-dimensional shape detecting sensor 12 of the robot 100 measures or detects a shape of a travel surface "G" in the forward travelling direction with a real time manner, and the inclination angle sensor 14 of the robot 100 measures or detects the inclination angle (i.e., roll angle and pitch angle) of the body 10 with a real time manner. The measurement area of the three-dimensional shape detecting sensor 12 for the real movement phase can be the measurement area (v×u) used for the training phase.

A description is given of a process performable for the real movement phase with reference to FIG. 13, which is a flowchart illustrating the steps of processes performable for the real movement phase.

The feature data generator 102 performs the processes of steps S201 to S208 for the real movement phase similar to the processes of the training phase.

At step S201, the three-dimensional shape detecting sensor 12 measures or detects and acquires the three dimensional shape data such as 3D point cloud data of the travel surface "G" in the forward travelling direction.

At step S202, the point cloud data included in the area corresponding to the bottom face size of the robot 100 defined by length "L"×width "W" is extracted from the 3D point cloud data of the travel surface "G" acquired at step S201. Then, at step S203, noise is removed from the extracted point cloud data.

After removing the noise at step S203, at step S204, the x-y plane of the 3D point cloud data is divided into a grid pattern. Then, at step S205, the representative value (e.g., average value) of the z' value of one or more point cloud data included in the each divided grid is calculated. Then, at step S206, it is checked whether a defective grid exists. If the defective grid exists (S206: YES), at step S207, the representative value of the z' value of the defective grid is supplemented.

At step S208, the feature data (i.e., feature vector) of the travel surface "G" is generated based on the z' value (i.e., representative value) of each one of the grids.

At step S209, as illustrated in FIG. 11B, the inclination angle prediction generator 106 acquires a prediction value $\theta_P$ of the inclination angle corresponding to the feature data (i.e., feature vector) of the travel surface "G" based on the first and second prediction models stored in the storage area 105. Specifically, the inclination angle prediction generator 106 substitutes the feature data (i.e., feature vector) gener-
ated at step S208 for the term of explanatory variable ($z_{1,1}$, $z_{1,2}$, $z_{1,3}$ ... $z_{m,n}$) of the first prediction model used for predicting the roll angle expressed by the equation (1), and acquires a result value $\theta_{P\_roll}$ as a prediction value of the roll angle. Further, the inclination angle prediction generator 106 substitutes the feature data (i.e., feature vector) generated at step S208 for the term of explanatory variable ($z_{1,1}$, $z_{1,2}$, $z_{1,3}$ ... $z_{m,n}$) of the second prediction model used for predicting the pitch angle expressed by the equation (2), and acquires a result value $\theta_{P\_pitch}$ as a prediction value of the pitch angle.

At step S210, the prediction correction unit 107 acquires the inclination angle (i.e., roll angle and pitch angle) measured or detected by the inclination angle prediction generator 106.

At step S211, the prediction correction unit 107 corrects the prediction value of the inclination angle acquired at step S209 based on the inclination angle acquired at step S210 because the prediction value of the inclination angle acquired at step S209 corresponds to the inclination angle that is detected with respect to the x'-y' plane of robot coordinate system of the robot 100, indicated by the three dimensional orthogonal coordinate system of x'y'z'.

For example, when the robot 100 moves or travels on the horizontal face as illustrated in FIG. 14A, the x'-y' plane of the robot coordinate system indicated by the three dimensional orthogonal coordinate system of x'y'z' and the x-y plane of the world coordinate system, indicated by the three dimensional orthogonal coordinate system of xyz setting the vertical direction as the z-axis are parallel with each other. Therefore, the prediction value $\theta_P$ of the inclination angle acquired at step S209 can be used as the inclination angle with respect to the x-y plane of the world coordinate system.

By contrast, when the robot 100 moves or travels on a slope having an inclination angle of "M" degrees with respect to the horizontal face as illustrated in FIG. 14B, the x'-y' plane of the robot coordinate system, and the x-y plane of the world coordinate system are not parallel with each other. Therefore, the prediction value $\theta_P$ of the inclination angle acquired at step S209 cannot be used as the inclination angle with respect to the x-y plane of the world coordinate system.

Therefore, at step 211, the prediction correction unit 107 calculates a prediction value $\theta'_{P\_roll}$ as a corrected prediction roll angle and a prediction value $\theta'_{P\_pitch}$ as a corrected prediction pitch angle based on the following equations (3) and (4). As to the equation (3), $\theta_{P\_roll}$ indicates the prediction value of the roll angle acquired at step S209, and $\theta_{M\_roll}$ indicates a measured value of the roll angle acquired at step S210. As to the equation (4), $\theta_{P\_pitch}$ indicates the prediction value of the pitch angle acquired at step S209, and $\theta_{M\_pitch}$ indicates a measured value of the pitch angle acquired at step S210.

$$\text{corrected prediction roll angle } \theta'_{P\_roll} = \theta_{P\_roll} - \theta_{M\_roll} \quad (3).$$

$$\text{corrected prediction pitch angle } \theta'_{P\_pitch} = \theta_{P\_pitch} - \theta_{M\_pitch} \quad (4).$$

At step S212, the overturn prevention controller 108 performs an overturn prevention process based on the prediction value (i.e., $\theta'_{P\_roll}$, $\theta'_{P\_pitch}$) acquired at step S211. Then, the sequence returns to step S201, and the above described sequence of steps S201 to S212 is repeatedly performed.

A description is given of an overturn prevention or evasion process performable by the overturn prevention controller 108 with reference to FIG. 15, which is a flowchart illustrating the steps of an overturn prevention process performable by the overturn prevention controller 108.

When the prediction value of the roll angle and the pitch angle (i.e., $\theta'_{P\_roll}$, $\theta'_{P\_pitch}$) are acquired at step S211, the overturn prevention controller 108 performs the following processes.

At step S301, it is determined whether at least any one of the prediction value $\theta'_{P\_roll}$ of the roll angle and the prediction value $\theta'_{P\_pitch}$ of the pitch angle exceeds a pre-set overturn prevention limit value. The overturn prevention limit value means the upper limit of the inclination angle that the overturn can be evaded or prevented by using the control processing by the posture stabilizer 18. If at least any one of the prediction values exceeds the overturn prevention limit value (S301: YES), the sequence proceeds to step S306.

At step S306, the drive unit 16 is controlled to turn the robot 100 to the left direction or right direction for a given angle, and then the sequence is completed. In this case, the travelling course or direction of the robot 100 can be changed, and thereby the robot 100 can evade the overturn by taking a detour of danger area. A step S306, when the prediction value $\theta'_{P\_roll}$ of the roll angle becomes a positive value (i.e., the robot 100 is expected to be inclined to the left side of the traveling direction), the drive unit 16 is preferably controlled to turn the robot 100 to the left direction, and when the prediction value $\theta'_{P\_roll}$ of the roll angle becomes a negative value (i.e., the robot 100 is expected to be inclined to the right side of the traveling direction), the drive unit 16 is preferably controlled to turn the robot 100 to the right direction.

By contrast, if both of the prediction values is the overturn prevention limit value or less (S301: NO), the sequence proceeds to step S302. At step S302, a required acceleration "α" is calculated based on the prediction value $\theta'_{P\_pitch}$ of the pitch angle. The required acceleration "α" means the acceleration that is required to cancel or offset the gravitational acceleration effecting to the travelling direction of the robot 100 caused by the inclination of the travel surface in the forward travelling direction. The required acceleration "α" can be calculated by using the following equation (5). As to the equation (5), the prediction value (deg.) of the pitch angle is the prediction value $\theta'_{P\_pitch}$ acquired at step S211, in which the prediction value of the pitch angle becomes a positive value when the forward of the travelling direction of the robot 100 becomes higher than the rearward of the travelling direction of the robot 100, and the prediction value of the pitch angle becomes a negative value when the forward of the travelling direction of the robot 100 becomes lower than the rearward of the travelling direction of the robot 100.

$$\alpha(m/s^2) = (\text{Maximum acceleration of robot } (m/s^2)) \times (\text{prediction value of pitch angle (deg)}/90(\text{deg})) \quad (5)$$

At step S303, a required time "t" that the robot 100 can reach the travel surface in the forward travelling direction having the predicted inclination angle is calculated. Specifically, the required time "t" that the center of the measurement area (v×u) used for measuring and acquiring the three dimensional shape at the previous step S201 and the center of gravity "O" of the robot 100 will match with each other (see FIG. 8B) is calculated. The required time "t" can be computed from a distance between the center of the measurement area (v×u) and the center of gravity "O" of the robot 100 at the current time point, the travelling speed of the robot 100 at the current time point, and the required acceleration "α" calculated at step S302.

Then, step S304 and step S305 can be performed concurrently. At step S304, the drive unit 16 is controlled to change a travelling speed of the robot 100. Specifically, the drive unit 16 is controlled to accelerate or decelerate the travelling speed of the robot 100 by applying the required acceleration "α" calculated at step S302. When the forward of the travelling direction of the travel surface is an uphill, the required acceleration "α" becomes a positive value. Therefore, the gravitational acceleration effecting the robot 100 into the opposite direction of the travelling direction can be cancelled or offset, and thereby a situation that the robot 100 slows the travelling speed at the uphill and then stops on the uphill can be evaded or prevented. By contrast, when the forward of the travelling direction of the travel surface is a downhill, the required acceleration "α" becomes a negative value. Therefore, the gravitational acceleration effecting the robot 100 into the travelling direction can be cancelled or offset, and thereby a situation that the robot 100 accelerates the movement speed at the downhill and becomes dangerous situation can be evaded or prevented.

Further, at step S305, the posture stabilizer 18 is controlled so that the inclination angle (i.e., roll angle and pitch angle) of the robot 100 after the time "t" elapses is within a given allowable angle range as illustrated in FIG. 16. The given allowable angle range means a range of the inclination angle that the robot 100 can travel without the overturning during the travelling. In this example configuration, the allowable angle range of the roll angle can be pre-set with a given angle range using zero (0) degree as the center of the given angle range, and the allowable angle range of the pitch angle can be pre-set with a given angle range using zero (0) degree as the center of the given angle range.

FIG. 16A illustrates a case that the posture stabilizer 18 is controlled before the time "t" elapses to cancel or offset a predicted inclination along the roll angle direction, and thereby the roll angle of the robot 100 becomes zero when the time "t" elapses. Further, FIG. 16B illustrates a case that the posture stabilizer 18 is controlled before the time "t" elapses to cancel or offset a predicted inclination along the pitch angle direction, and thereby the pitch angle of the robot 100 becomes zero when the time "t" elapses. FIGS. 16A and 16B illustrate the cases that the roll angle and the pitch angle are controlled independently for the simplicity of description, but the posture stabilizer 18 can be controlled to concurrently set both of the roll angle and the pitch angle within the allowable angle range when the time "t" elapses.

As above described, the robot 100 can change the posture of the robot 100 before the time "t" elapses based on the inclination angle predicted from the shape of the travel surface in the forward travelling direction to cancel the effect of inclination of the travel surface. Therefore, the robot 100 can evade the overturn even if the shape of the travel surface changes abruptly. Further, the robot 100 can perform the posture control based on the prediction model of the inclination angle generated by the machine learning, with which the robot 100 can be adapted to various travelling environments by performing suitable machine learning in advance.

In the above description, the example embodiment is applied to a single robot, but not limited hereto. For example, as illustrated in FIG. 17, an information processing system 1000 connecting multiple robots 100 and an information processing apparatus 200 communicably via a network 50 such as local area network (LAN) or wide area network (WAN) can be configured. As to the information processing system 1000, the above described functional units of the robot 100 (see FIG. 5) such as the prediction model generator 104, the inclination angle prediction generator 106 and the storage area 105 can be implemented by the information processing apparatus 200.

As to the information processing system 1000, the learning data generator 103 of the robot 100 transmits the generated learning data to the information processing apparatus 200 via the network 50 during the training phase. After receiving the learning data, the prediction model generator 104 in the information processing apparatus 200 performs the machine learning based on the learning data received from the robot 100, generates the prediction model of the inclination angle (i.e., roll angle and pitch angle), and stores the generated prediction model in the storage area 105.

Further, as to the real movement phase, the feature data generator 102 of the robot 100 transmits the generated feature data of the travel surface in the forward travelling direction to the information processing apparatus 200 via the network 50. After receiving the feature data of the travel surface, the inclination angle prediction generator 106 devised in the information processing apparatus 200 acquires the prediction value $\theta_P$ of the inclination angle corresponding to the feature data received from the robot 100 based on the prediction model stored in the storage area 105, and transmits the acquired prediction value $\theta_P$ to the robot 100. Then, the prediction correction unit 107 of the robot 100 corrects the prediction value $\theta_P$ received from the information processing apparatus 200 to the corrected prediction value $\theta'_P$, and the overturn prevention controller 108 performs the overturn prevention processing based on the corrected prediction value $\theta'_P$.

As to the information processing system 1000, the machine learning can be continued based on the learning data provide-able from each one of the robots 100 at any timing. Therefore, the precision of the prediction model can be enhanced along the time line, and each one of the robots 100 can use the precision-enhanced prediction model.

As above described, the robot 100 can stabilize the posture of the robot 100 based on the prediction value of the inclination angle of the body 10 when the robot 100 is to reach the position on the travel surface in the forward travelling direction to prevent or evade the overturn. Therefore, the posture stabilization of the robot 100 is required to be completed when the robot 100 reaches the position on the travel surface having the predicted inclination angle. However, if the timing that the posture stabilization of the robot 100 is completed is too early from the timing that the robot 100 reaches the position on the travel surface having the predicted inclination angle, the posture of the robot 100 may be destabilized.

In view of this destabilizing issue, as to the one or more example embodiments, the following processes can be performed for the real movement phase to match the timing that the robot 100 reaches the position on the travel surface having the predicted inclination angle and the timing the posture stabilization of the robot 100 is completed. Hereinafter, a control process is described with reference to FIG. 18, which is a flowchart of the steps of a control process for the real movement phase of the robot 100.

At step S401, the moved distance of the robot 100 is cumulatively added. The moved distance of the robot 100 can be calculated by using known odometry methods such as wheel encoder method, integrating values of an accelerometer, and visual odometry method.

At step S402, it is determined or monitored whether the cumulatively added moved distance becomes a given distance "Δd" (meter), in which the Δd is a positive real number. The distance "Δd" can be pre-set with a given value based on an installation angle of the three-dimensional shape detecting sensor 12, a processing speed of the computer 20, and a maximum movement speed of the robot 100.

When the cumulatively added moved distance becomes the distance "Δd" (S402: YES), the sequence proceeds to step S403. At step S403, the process of predicting the inclination angle is performed. The process of predicting the inclination angle performable at step S403 corresponds to steps S201 to S211 of FIG. 13.

Figure 19A:
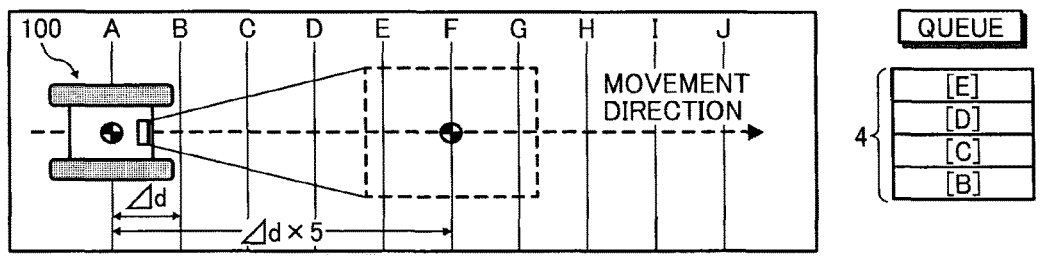

As to the one or more example embodiments, as illustrated in FIG. 19A, the three-dimensional shape detecting sensor 12 is set at a position to measure the three dimensional shape of the travel surface ahead of the robot 100 at the distance of "(n+1)×Δd" (meters) when viewed from a gravitation position of the robot 100, in which "n" is a whole number of, for example, two or more. At the process of predicting the inclination angle (step S403), the prediction values of the roll angle and the pitch angle (i.e., $\theta'_{P\_roll}$, $\theta'_{P\_pitch}$) of the robot 100 are acquired based on the three dimensional shape data such as 3D point cloud data of the travel surface ahead of the robot 100 at the distance of "(n+1)×Δd" (meters) when viewed from the body 10 of the robot 100.

At step S404, it is determined whether at least any one of the prediction value of the roll angle $\theta'_{P\_roll}$ and the prediction value of the pitch angle $\theta'_{P\_pitch}$ acquired at step S403 exceeds the pre-set overturn prevention limit value. If the prediction values of both of the roll angle and the pitch angle are the overturn prevention limit value or less (S404: NO), the sequence proceeds to step S405. At step S405, the latest prediction value (i.e., $\theta'_{P\_roll}$, $\theta'_{P\_pitch}$) acquired at step S403 is written to a queue (i.e., en-queue) and the oldest prediction value (i.e., $\theta'_{P\_roll}$, $\theta'_{P\_pitch}$) is read out from the queue (i.e., de-queue).

The "queue" means a queue having a memory configuration such as first-in first-out (FIFO). As to the one or more example embodiments, the queue can store prediction value (i.e., $\theta'_{P\_roll}$, $\theta'_{P\_pitch}$) with of the number "n."

Then, at step S406, the cumulatively added moved distance is reset. At step S407, a control level required for the posture stabilizer 18 is calculated by the inverse kinematics (IK) using the prediction value (i.e., $\theta'_{P\_roll}$, $\theta'_{P\_pitch}$) read out at step S405.

For example, if the prediction value of the roll angle (i.e., $\theta'_{P\_roll}$) and the prediction value of the pitch angle (i.e., $\theta'_{P\_pitch}$) read out at step S405 are respectively "φ[rad]" and "θ[rad]," the roll angle and the pitch angle of the body 10 are respectively required to be changed with "−φ[rad]" and "−θ[rad]" to cancel or offset the prediction value of the roll angle and pitch angle respectively having "φ[rad]" and "θ[rad]." At step S407, the control level required for the posture stabilizer 18 is calculated by the inverse kinematics (IK) to change the roll angle and the pitch angle of the body 10 respectively to "−φ[rad]" and "−θ[rad]." The "IK" can be pre-set with a modeling corresponding to the mechanical configuration employed for the posture stabilizer 18.

At step S408, the movement speed or traveling speed of the robot 100 is calculated based on the control level calculated at step S407 as follows. Hereinafter, it is assumed that the posture stabilizer 18 has a mechanical configuration that can be driven with a constant angular velocity "ω" [rad/s], and the control level of the posture stabilizer 18 calculated at step S407 is used as an input angle value [rad] of the stepping motor.

In this example case, the time "Δτ" required to drive the posture stabilizer 18 for the control level "Δψ" [rad], which is a difference of the target control level and the current input angle value calculated at step S407, can be expressed by using the equation (6).

$$\Delta_\tau = \Delta_{\phi/\omega} \quad (6)$$

In this example case, if it is assumed that the robot 100 moves with a movement speed or traveling speed "v" [m/s] (i.e., uniform linear motion), the robot 100 reaches the position on the travel surface ahead of the robot 100 at the distance "Δd" [m] at the time "Δt" that can be expressed by the equation (7)

$$\Delta_t = \Delta_{d/v} \quad (7)$$

As to the one or more example embodiments, the posture stabilization of the robot 100 is required to be completed when the robot 100 reaches the position on the travel surface having the predicted inclination angle. Therefore, the following equation (8) is required to be satisfied.

$$\Delta_\tau < \Delta_t \quad (8)$$

Therefore, the equation (9) can be set based on the equations (6) to (8).

$$v < \Delta_d \cdot \omega / \Delta_\phi \quad (9)$$

As to the one or more example embodiments, the posture stabilization of the robot 100 is required to be completed before the robot 100 reaches the position on the travel surface having the predicted inclination angle, and also the posture stabilization of the robot 100 is required to be completed at the timing closer to the timing when the robot 100 reaches the position on the travel surface having the predicted inclination angle. Therefore, a difference of the left side and the right side of the equation (9) is required to be smaller as much as possible. Therefore, as to the one or more example embodiments, the movement speed or traveling speed "v" of the robot 100 when the robot 100 moves and then reaches the position on the travel surface ahead of the robot 100 at the distance "Δd" [m] can be defined by the equation (10).

$$v = \beta \cdot \Delta_d \cdot \omega / \Delta_\phi \quad (10)$$

In the equation (10), the coefficient "β" is a positive real number less than one (1), and the coefficient "β" can be pre-set with a suitable value in view of a margin. With this configuration, the time "Δt" when the robot 100 reaches the position on the travel surface ahead of the robot 100 at the distance "Δd" [m] becomes the substantially same as the time "Δτ" required to drive the posture stabilizer 18 for the control level "Δψ" [rad].

When the movement speed or traveling speed "v" of the robot 100 is calculated at step S408, at step S409, the posture stabilizer 18 is controlled with the control level "Δψ" [rad] calculated at step S407, and then at step S410, the drive unit 16 is controlled with the movement speed or traveling speed "v" calculated at step S408. Then, the sequence returns to step S401, and repeats the above described processes.

By contrast, if at least one of the prediction values exceeds the overturn prevention limit value (S404: YES), the sequence proceeds to step S411.

At step S411, the drive unit 16 is controlled to turn the robot 100 to the left or right with a given angle. With employing this configuration, the travelling course or direction of the robot 100 can be changed, and thereby the robot 100 can evade the overturn by taking a detour of danger area.

Then, at step S412, the cumulatively added moved distance is reset, and at step S413, the queue is cleared. Then, the sequence returns to step S401, and repeats the above described processes.

As to the above described one or more example embodiments, the movement speed or traveling speed "v" of the robot 100 can be set by the equation (10). Therefore, the time "Δt" when the robot 100 reaches the position on the travel surface ahead of the robot 100 at the distance "Δd" [m] can be substantially matched with the time "Δτ" required to complete the driving of the posture stabilizer 18, and thereby the robot 100 can be moved with a stable manner.

Further, steps S401 to S410 of FIG. 18 are described in detail with reference to FIG. 19 illustrating one example. As illustrated in FIG. 19A, when the robot 100 reaches the point "A" of the travel surface, the robot 100 acquires a three dimensional shape of the travel surface at the point "F" that is ahead from the point "A" at a distance of "Δd×5." Then, based on the acquired three dimensional shape at the point "F," the robot 100 acquires the prediction value of inclination angle (i.e., $\theta'_{P\_roll}$, $\theta'_{P\_pitch}$) of the body 10 when the robot 100 is to reach the point "F". Hereinafter, a prediction value at the point "F" is referred to the prediction value [F], and the prediction values at other points are also referred with the same way.

Figure 19B:
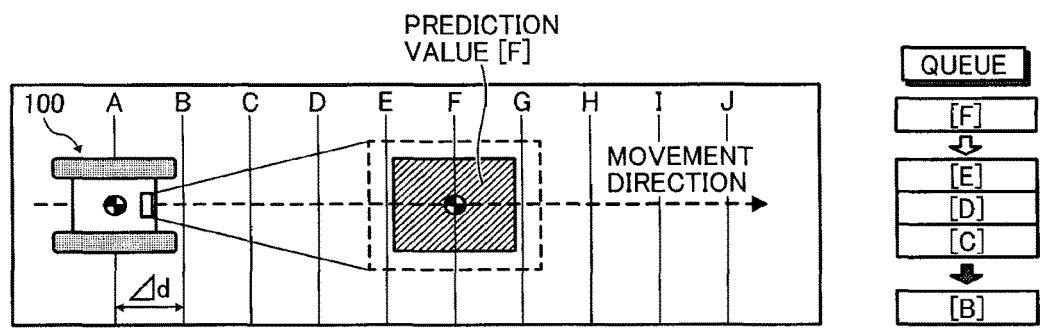

Then, as illustrated in the queue of FIG. 19B, the robot 100 writes the latest prediction value [F] acquired newly to the queue, and reads out the oldest prediction value [B] stored in the queue at this timing.

Figure 19C:
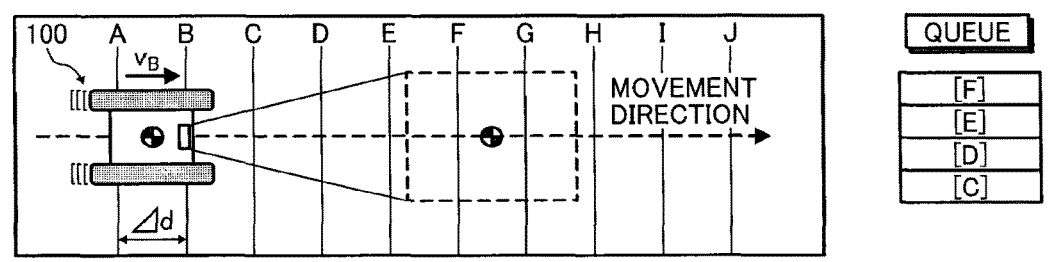

Then, the robot 100 resets the moved distance, and then calculates the control level of the posture stabilizer 18 based on the prediction value [B], calculates the movement speed or traveling speed [$v_B$] of the robot 100 based on the calculated control level, controls the posture stabilizer 18 with the calculated control level, and controls the drive unit 16 with the calculated movement speed or traveling speed [$v_B$]. Then, as illustrated in FIG. 19C, the robot 100 moves from the point "A" to the point "B" with the movement speed or traveling speed [$v_B$]. When the robot 100 is moving to the point "B," as illustrated in the queue of FIG. 19C, four prediction values [C], [D], [E], [F] are stored in the queue with this order.

Figure 19D:
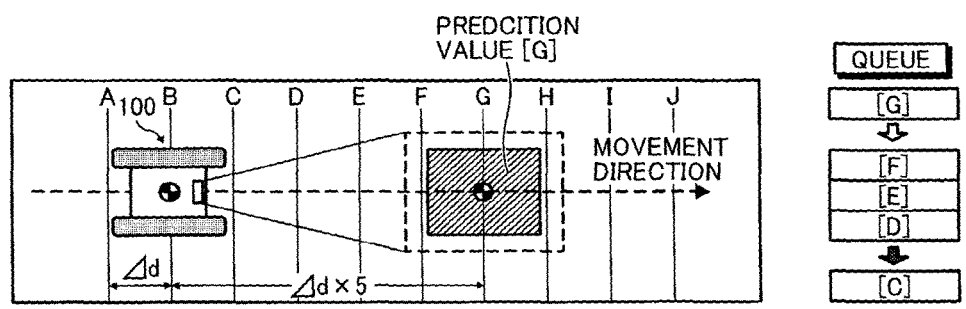

Then, as illustrated in FIG. 19D, when the robot 100 reaches the point "B," the robot 100 acquires a three dimensional shape at the point "G" that is ahead from the point "B" at a distance of "Δd×5." Then, and based on the acquired three dimensional shape at the point "G" the robot 100 acquires a prediction value [G] of inclination angle of the body 10 when the robot 100 is to reach the point "G" Then, as illustrated in in the queue of FIG. 19D, the robot 100 writes the latest prediction value [G] acquired newly to the queue, and reads out the oldest prediction value [C] stored in the queue at this timing.

Figure 19E:
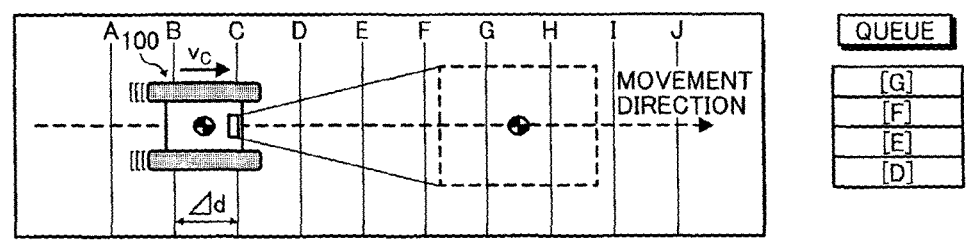

Then, the robot 100 resets the moved distance, and then calculates the control level of the posture stabilizer 18 based on the prediction value [C], calculates the movement speed or traveling speed [vc] of the robot 100 based on the calculated control level, controls the posture stabilizer 18 with the calculated control level, and controls the drive unit 16 with the calculated movement speed or traveling speed [vc]. Then, as illustrated in FIG. 19E, the robot 100 moves from the point "B" to the point "C" with the movement speed or traveling speed [vc]. When the robot 100 is moving to the point "C," as illustrated in the queue of FIG. 19E, four prediction values [D], [E], [F], [G] are stored in the queue with this order.

Then, the same sequence can be performed repeatedly for the robot 100 as required. As indicated in FIGS. 19A to 19E, each time the robot 100 travels for a given distance such as a unit distance Δd, the three-dimensional shape detecting sensor 12 detects the three dimensional shape of the travel surface ahead of the robot 100 at the distance of "(n+1)×Δd," and the inclination angle prediction generator 106 generates the prediction value of the inclination angle of the body 10, and stores the prediction value in the queue.

As to the above described one or more example embodiments, the robot that can perform the feed-forward control to stabilize the posture based on the predicted inclination angle of the robot can be devised.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

The functional units as described above can be realized by a computer-executable program written by legacy programming language or object-oriented programming language such as assembler language, C language, C++ language, C# language, and Java (registered trademark), and the program can be distributed via networks such as telecommunication line or upon being written on a computer-computer-readable recording medium such as ROM, electrically erasable and programmable read only memory (EEPROM), electrically programmable read only memory (EPROM), flash memory, flexible disk, compact disc read only memory (CD-ROM), compact disc rewritable (CD-RW), digital versatile disk (DVD)-ROM, DVD-RAM, DVD-RW, Blu-ray disc, secure digital (SD) card, and magneto-optical disc (MO). All or some of the functional units described above can be implemented, for example, on a programmable device such as a field programmable gate array (FPGA), or as an application specific integrated circuit (ASIC). To implement such functional units on the programmable device, circuit configuration data (bit stream data) to be downloaded to the programmable device can be distributed using a recording medium that stores data written in, for example, a hardware description language (HDL), Very High Speed Integrated Circuit Hardware Description Language (VHDL), or Verilog HDL. Each of the functions of the described embodiments may be implemented by one or more processing circuits or circuitry. Processing circuitry includes a programmed processor, as a processor includes circuitry.

What is claimed is:

1. A robot comprising:
circuitry configured to:
detect a three dimensional shape of a travel surface existing in a forward travelling direction of the robot;
stabilize a posture of a body of the robot;
generate feature data of the detected three dimensional shape;
generate a prediction value of an inclination angle of the body when the robot is to reach a position on the travel surface in the forward travelling direction at a future time point based on the feature data and a prediction model; and
control to prevent an overturn of the robot based on the prediction value, wherein the circuitry controls a travelling speed of the robot so that a first time when the robot reaches the position on the travel surface in the forward travelling direction of the robot becomes longer than a second time required to complete stabilizing the posture of the body of the robot without causing the overturn of the robot.

2. The robot of claim 1, wherein the prediction model employs a regression model that uses the feature data of the three dimensional shape of the travel surface as an explanatory variable, and the inclination angle of the body when the robot is to reach the position on the travel surface as a response variable.

3. The robot of claim 1, wherein the circuitry is further configured to:
detect the inclination angle of the body; and
correct the prediction value based on the inclination angle detected.

4. The robot of claim 3, wherein the circuitry is further configured to control driving of the body based on the prediction value or the corrected prediction value to change the travelling direction of the robot.

5. The robot of claim 3, wherein the circuitry is further configured to:
generate a combination of the feature data of the three dimensional shape of the travel surface generated and the inclination angle detected when the robot is to reach the position on the travel surface in the forward travelling direction at the future time point as learning data; and
generate the prediction model by applying machine learning using the generated learning data.

6. The robot of claim 1, wherein the inclination angle includes a roll angle and a pitch angle.

7. The robot of claim 1, wherein the circuitry is further configured to:
store the prediction value using a first-in first-out (FIFO) queue with a number "n" settable with a whole number of two or more,
wherein the circuitry detects the three dimensional shape of the travel surface ahead of the robot at a distance of "(n+1)×Δd" each time the robot travels for a given distance "Δd,"
wherein the circuitry generates the prediction value of the inclination angle of the body each time the robot travels for the given distance "Δd," and stores the prediction value in the FIFO queue,
wherein the circuitry reads out the prediction value from the FIFO queue each time the robot travels for the given distance "Δd," and controls the stabilization of the posture of the body of the robot based on the read-out prediction value.

8. A non-transitory storage medium storing a program that, when executed by a computer, causes the computer to execute a method of stabilizing a posture of a body of a robot, the method comprising:
detecting a three dimensional shape of a travel surface in a forward travelling direction of the robot by using a three-dimensional shape detecting sensor;
generating feature data of the detected three dimensional shape;
generating a prediction value of an inclination angle of the body when the robot is to reach a position on the travel surface in the forward travelling direction based on the generated feature data and a prediction model, the prediction model using the feature data of the three dimensional shape of the travel surface as an explanatory variable and the inclination angle of the body when the robot is to reach the position on the travel surface in the forward travelling direction at a future time point as a response variable; and
controlling a posture stabilizer based on the prediction value to prevent an overturn of the robot by controlling a travelling speed of the robot so that a first time when the robot reaches the position on the travel surface in the forward travelling direction of the robot becomes longer than a second time required to complete stabilizing the posture of the body of the robot without causing the overturn of the robot.

9. An information processing system comprising:

a robot being one or more robots; and an information processing apparatus connectable with the robot via a network, the robot including first circuitry configured to:

detect a three dimensional shape of a travel surface existing in a forward travelling direction of the robot;

stabilize a posture of a body of the robot;

generate feature data of the detected three dimensional shape, and transmit the generated feature data to the information processing apparatus;

control to prevent an overturn of the robot;

detect an inclination angle of the body; and generate a combination of the feature data of the three dimensional shape of the travel surface generated and the inclination angle detected when the robot is to reach a position on the travel surface in the forward travelling direction at a future time point as learning data, and transmits the generated learning data to the information processing apparatus, the information processing apparatus including second circuitry configured to:

generate a prediction value of the inclination angle of the body when the robot is to reach the position on the travel surface in the forward travelling direction at the future time point based on the feature data received from the robot and a prediction model, and transmit the generated prediction value to the robot; and generate the prediction model by applying machine learning using the generated learning data, wherein the first circuitry of the robot controls to prevent an overturn of the robot based on the prediction value received from the information processing apparatus.

* * * * *